US012713284B2

(12) United States Patent
Fu et al.

(10) Patent No.: US 12,713,284 B2
(45) Date of Patent: Aug. 18, 2026

(54) METHODS AND APPARATUSES FOR REFLECTIVE QUALITY OF SERVICE (QoS)

(71) Applicant: Telefonaktiebolaget LM Ericsson (publ), Stockholm (SE)

(72) Inventors: Zhang Fu, Stockholm (SE); Min Wang, Luleå (SE); Zhang Zhang, Beijing (CN)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 381 days.

(21) Appl. No.: 18/267,310

(22) PCT Filed: Nov. 29, 2021

(86) PCT No.: PCT/EP2021/083413
§ 371 (c)(1),
(2) Date: Jun. 14, 2023

(87) PCT Pub. No.: WO2022/135845
PCT Pub. Date: Jun. 30, 2022

(65) Prior Publication Data

US 2024/0056874 A1 Feb. 15, 2024

(51) Int. Cl.
*H04W 28/02* (2009.01)
*H04W 92/18* (2009.01)

(52) U.S. Cl.
CPC ... *H04W 28/0268* (2013.01); *H04W 28/0273* (2013.01); *H04W 92/18* (2013.01)

(58) Field of Classification Search
CPC . H04M 15/66; H04M 15/00; H04W 28/0268; H04W 28/24; H04W 88/04; H04W 28/02
See application file for complete search history.

(56) References Cited

U.S. PATENT DOCUMENTS

| | | | | |
|---|---|---|---|---|
| 11,259,350 | B1 * | 2/2022 | Pan | H04W 88/04 |
| 12,010,557 | B2 * | 6/2024 | Kuo | H04W 28/0263 |

(Continued)

FOREIGN PATENT DOCUMENTS

| | | | | |
|---|---|---|---|---|
| EP | 3979747 A1 * | 4/2022 | | H04W 88/04 |
| WO | 2019/161269 A1 | 8/2019 | | |

OTHER PUBLICATIONS

International Search Report and Written Opinion issued in International Application No. PCT/EP2021/083413, dated Mar. 14, 2022 (9 pages).

(Continued)

*Primary Examiner* — Nathan S Taylor
(74) *Attorney, Agent, or Firm* — Rothwell, Figg, Ernst & Manbeck, P.C.

(57) ABSTRACT

A relay UE (502) having a PC5 link with a remote UE (501) creates a modified downlink (DL) packet by adding one or more reflective quality-of-service (QoS) indicators to the DL packet and transmits the modified DL packet on the PC5 link in a PC5 QoS flow to the remote UE. The remote UE receives the modified DL packet, uses the one or more reflective QoS indicators to derive one or more mapping relations, and applies the one or more derived mapping relations to map an uplink (UL) packet to the QoS flow and (Continued)

transmit the UL packet on the PC5 link. The relay UE receives the UL packet and transmits the UL packet to a network node (504) or a second relay UE.

16 Claims, 12 Drawing Sheets

(56) References Cited

U.S. PATENT DOCUMENTS

| | | | | |
|---|---|---|---|---|
| 2015/0319076 | A1* | 11/2015 | Vasseur | H04L 45/124 370/238 |
| 2017/0250875 | A1* | 8/2017 | Jensen | H04L 41/16 |
| 2020/0092181 | A1* | 3/2020 | Thiagarajan | H04L 45/121 |
| 2020/0296696 | A1* | 9/2020 | Goldhamer | H04W 4/40 |
| 2021/0084542 | A1* | 3/2021 | Ahmad | H04W 4/025 |
| 2021/0153063 | A1* | 5/2021 | Zhang | H04W 88/04 |
| 2021/0289391 | A1* | 9/2021 | Paladugu | H04W 88/04 |
| 2021/0298070 | A1* | 9/2021 | Zhang | H04W 74/04 |
| 2021/0410002 | A1* | 12/2021 | Shariat | H04W 76/23 |
| 2022/0086682 | A1* | 3/2022 | Watfa | H04W 76/15 |
| 2022/0095168 | A1* | 3/2022 | Kuo | H04W 88/04 |
| 2022/0095398 | A1* | 3/2022 | Pan | H04W 76/14 |
| 2022/0322135 | A1* | 10/2022 | Xu | H04W 28/0257 |
| 2023/0018378 | A1* | 1/2023 | Guo | H04W 28/24 |
| 2023/0046436 | A1* | 2/2023 | Liu | H04W 28/02 |
| 2023/0063139 | A1* | 3/2023 | Du | H04W 40/22 |
| 2023/0127924 | A1* | 4/2023 | Srinivasan | H04W 28/0268 370/328 |
| 2023/0180313 | A1* | 6/2023 | Freda | H04W 76/14 370/310 |
| 2024/0056835 | A1* | 2/2024 | Centonza | H04W 28/18 |
| 2025/0016611 | A1* | 1/2025 | Watfa | H04W 28/0268 |

OTHER PUBLICATIONS

Oppo, "KI#3: Update to Sol #6, 24, 25 to address ENs", 3GPP SA-WG2 Meeting #141E, S2-2008283, Elbonia, Oct. 12-23, 2020, 11 pages, XP051948348.

Huawei et al., "KI#3, Sol#24: Update on the configured QoS mapping", 3GPP TSG-WG SA2 Meeting #141E e-meeting, S2-2007215, Elbonia, Oct. 12-23, 2020, 4 pages, XP051938259.

3GPP TR 23.752 V0.5.0, "3rd Generation Partnership Project; Technical Specification Group Services and System Aspects; Study on system enhancement for Proximity based Services (ProSe) in the 5G System (5GS) (Release 17)", Sep. 2020, 161 pages.

3GPP TS 23.501 V16.5.0, "5G; System architecture for the 5G System (5GS) (3GPP TS 23.501 version V16.5.0 Release 16)", Jul. 2020, 444 pages.

3GPP TS 23.287 V16.3.0, "5G; Architecture enhancements for 5G System (5GS) to support Vehicle-to-Everything (V2X) services (3GPP TS 23.287 version V16.3.0 Release 16)", Jul. 2020, 59 pages.

3GPP TS 23.303 V16.0.0, "Universal Mobile Telecommunications System (UMTS); LTE; Proximity-based services (ProSe); Stage 2 (3GPP TS 23.303 version V16.0.0 Release 16)", Jul. 2020, 133 pages.

Oppo, 3GPP TSG RAN Meeting #86, RP-193253, "New SID: Study on NR sidelink relay", Sitges, Spain, Dec. 9-12, 2019, 5 pages.

3GPP TS 23.502 V16.5.0, "3rd Generation Partnership Project; Technical Specification Group Services and System Aspects; Procedures for the 5G System (5GS); Stage 2 (Release 16)", Jul. 2020, 594 pages.

* cited by examiner

METHODS AND APPARATUSES FOR REFLECTIVE QUALITY OF SERVICE (QoS)

CROSS REFERENCE TO RELATED APPLICATION

This application is a 35 U.S.C. § 371 National Phase Entry Application from PCT/EP2021/083413, filed Nov. 29, 2021, designating the United States, which claims priority to PCT/CN2020/138609, filed Dec. 23, 2020, the disclosures of which are incorporated herein by reference in their entirety.

TECHNICAL FIELD

Disclosed are embodiments related to reflective quality of service (QoS) in case of layer-3 (L3) User Equipment (UE)-to-Network relays.

BACKGROUND

A user equipment (UE) is any device (e.g., smartphone, computer, tablet, sensor, appliance, vehicle, etc.) capable of wireless communication with another device (e.g., another UE or an access point, such as a base station). Two UEs can communicate with each other either directly via the PC5 sidelink or they can communicate with each other through the Uu interface and via an application server (AS). As shown in FIG. 1, the Proximity Based Service (ProSe) 5G UE-to-Network relay entity provides the functionality to support connectivity to the network for remote UEs. The ProSe 5G UE-to-Network relay entity can be used for both public safety services and commercial services (e.g., an interactive service). A UE is considered to be a Remote UE for a certain ProSe UE-to-Network relay if the UE has successfully established a PC5 link to this ProSe 5G UE-to-Network relay. A Remote UE can be located within Next-Generation Radio Access Network (NG-RAN) coverage or outside of NG-RAN coverage. The solution of End-to-End QoS support for Layer-3 UE-to-Network Relay has been discussed in 3rd Generation Partnership Project (3GPP). Specifically, the solution addresses the aspects on "How to support end-to-end requirements between Remote UE and the network via a UE-to-Network Relay, including QoS (such as data rate, reliability, latency)" and "How the network allows and controls the QoS requirement for 5G ProSe UE-to-NW relay."

In the Layer 3 UE-to-NW relay solution, the Remote UE's data flow is served by the Relay UE's Protocol Data Unit (PDU) Session. As the UE-to-Network relay path comprises of two legs (PC5 and Uu) as shown in FIG. 4, the end-to-end QoS can be met only when the QoS requirements are properly split and satisfied over the two legs respectively.

As shown in FIG. 4, the end-to-end connection from the Remote UE to the AS involves two over-the-air links, i.e., Uu and PC5. Therefore, to meet the packet delay budget (PDB) for a particular service, the access network (AN) PDB utilized by the NG Radio Access Network (NG-RAN) needs to be reduced, in order to give some budgets for the PC5 link. Note that this is independent of whether L2 or L3 Relay architecture is used.

SUMMARY

One way to achieve this without affecting the NG-RAN is for the Session Management Function (SMF) to modify the PDB signaled to the NG-RAN in the QoS Profile for the QoS Flows of the Remote UE's traffic. The SMF follows the Policy and Charging Control (PCC) rules (if it is Policy Control Function (PCF) determined) or based on local configuration to deduct the PDB.

Alternatively, reflective QoS control over Uu can be leveraged for dynamic QoS handling of remote UE. In particular, it does not require any explicit intervention from SMF. This can potentially save on signaling between SMF and UE-to-Network Relay UE to frequently modify the relaying PDU session over Uu.

Reflective QoS enables the UE to map Uplink (UL) User Plane traffic to QoS Flows without SMF provided QoS rules, and it applies for Internet Protocol (IP) PDU Session and Ethernet PDU Session. This is achieved by creating UE derived QoS rules in the UE based on the received Downlink (DL) traffic. It shall be possible to apply Reflective QoS and non-Reflective QoS concurrently within the same PDU Session.

Reflective QoS is controlled on per-packet basis by using the Reflective QoS Indication (RQI) in the encapsulation header on N3 (and N9) reference point together with the QoS Flow Identifier (QFI) and together with a Reflective QoS Timer (RQ Timer) value that is either signaled to the UE upon PDU Session Establishment (or upon PDU Session Modification) or set to a default value. The RQ Timer value provided by the core network is at the granularity of PDU Session.

Certain challenges presently exist with respect to existing solutions for reflective quality-of-service (QoS). In order to support reflective QoS for remote UE in L3 U2N relay, one solution is being studied in 3GPP for Rel-17. In this solution, upon reception of a DL packet with Reflective QoS Indication (RQI) on the Uu for the remote UE, based on the QoS Flow Identifier (QFI) indicated, the UE-to-Network Relay needs to derive a QoS rule, corresponding to the PC5 QoS flow in the PC5 link to the remote UE. The derived rule can be applied for UL packets transferred in the PC5 link from the remote UE and the relay UE forwards the traffic using the QoS flow with the same QFI of the DL packets in the Uu leg. In order to achieve that, the UE-to-Network Relay needs to determine the PC5 QoS Identifier (PQI) based on the indicated 5G QoS Identifier (5QI) on the DL Uu (due to Reflective QoS). The UE-to-Network Relay may locally associate the remote UE (i.e., the PC5 QoS flow with the remote UE) to the derived QoS rule. The UE-to-Network Relay may then modify either the associated PC5 QoS flow or mapping between Uu and PC5 QoS flows towards the remote UE in order to match the PQI of the PC5 flow to the indicated 5QI over the DL Uu. The UE-to-Network Relay then uses, for example, the L2 Link Modification procedures to modify the related PC5 QoS flows.

In the above solution, the key point is that the relay UE needs to derive 5QI value which is associated with the DL Uu QoS flow (indicated via QFI field in the DL service data adaptation protocol (SDAP) header). However, when reflective QoS is being applied, the NG-RAN base station (gNB) will not signal the 5QI value of the flow to the relay UE. In other words, there is no field to carry 5QI in the DL SDAP header. Therefore, it is important to study how to improve the solution so that reflective QoS can be applicable to the PC5 link with the remote UE.

In addition, there is no support of reflective QoS for UE to UE relay. So, it would be beneficial to design a solution which is fully or partly applicable to both UE to network relay and UE to UE relay.

Aspects of the invention may overcome one or more of the problems with the existing solution by providing the advantage that, when reflective QoS is used, the UE-to-Network (U2N) may be capable of deriving 5QI based on the QFI in the DL Uu packets and, thus, may be capable of configuring the corresponding PC5 QoS flow in the PC5 link with the remote UE.

One aspect of the invention may provide a method performed by a relay user equipment (UE) that has a PC5 link with a remote UE. The method may include receiving a downlink (DL) packet. The method may include adding one or more reflective quality-of-service (QoS) indicators to the DL packet, thereby creating a modified DL packet. The method may include transmitting the modified DL packet containing the one or more reflective QoS indicators on the PC5 link in a PC5 QoS flow to the remote UE.

In some embodiments, the method may further include receiving a UE capability indicator transmitted by the remote UE, and the UE capability indicator may indicate whether the remote UE supports reflective QoS on a PC5 link. In some embodiments, the method may further include using the received UE capability indicator to determine that the remote UE supports reflective QoS on a PC5 link and adding the one or more reflective QoS indicators to the DL packet in response to determining that the remote UE supports reflective QoS on a PC5 link. In some embodiments, the method may further include transmitting the UE capability indicator that indicates whether the remote UE supports reflective QoS on a PC5 link to a network node or a second relay UE. In some embodiments, the method may further include transmitting a UE capability indicator that indicates whether the relay UE supports reflective QoS on a PC5 link to a network node or a second relay UE. In some embodiments, the method may further include receiving service information transmitted by the remote UE, and the service information may indicate whether the remote UE will adopt or allow reflective QoS for each of one or more services.

In some embodiments, the method may further include determining whether the received DL packet is for the relay UE or for the remote UE. In some embodiments, the received DL packet may include a target Internet Protocol (IP) address, and the target IP address may be used to determine whether the received DL packet is for the relay UE or for the remote UE. In some embodiments, the received DL packet may include a QoS Flow Identifier (QFI), and the QFI may be used to determine whether the received DL packet is for the relay UE or for the remote UE.

In some embodiments, the one or more reflective QoS indicators may include a QoS Flow Identifier (QFI), a data radio bearer (DRB) mapping indication (RDI), and/or a reflective QoS indication (RQI).

In some embodiments, the relay UE may have a Uu link with a network node, and the received DL packet may be transmitted by the network node on the Uu link in a Uu QoS flow. In some embodiments, the method may further include deriving one or more mapping relations from the received DL packet. In some embodiments, the received DL packet may include a header, and the one or more mapping relations may be derived using the header. In some embodiments, the DL packet may be a service data adaptation protocol (SDAP) packet data unit (PDU), and the one or more mapping relations may be derived using an SDAP header of the SDAP PDU. In some embodiments, the method may further include receiving an uplink (UL) packet transmitted by the remote UE on the PC5 link in the PC5 QoS flow and applying the one or more derived mapping relations to map the UL packet to the Uu QoS flow and transmit the UL packet on the Uu link to the network node.

In some embodiments, the method may further include using the derived one or more mapping relations to determine a PC5 QoS Flow Identifier (PFI) for the received DL packet. In some embodiments, the received DL packet may include a QoS Flow Identifier (QFI), and the PFI may be determined using the QFI of the received DL packet and a table that maps QFIs to PFIs.

In some embodiments, the method may further include determining a PC5 data radio bearer (DRB), and the determined PC5 DRB may be used to carry the PC5 QoS flow. In some embodiments, the method may further include receiving an uplink (UL) packet transmitted by the remote UE on the PC5 link in the PC5 QoS flow carried by the PC5 DRB.

In some embodiments, a Uu DRB may carry the Uu QoS flow, and determining the PC5 DRB may include comparing the PC5 DRB and the Uu DRB. In some embodiments, comparing the PC5 DRB and the Uu DRB may consider the QoS configurations of the PC5 DRB and the Uu DRB. In some embodiments, comparing the PC5 DRB and the Uu DRB may consider the QoS configurations of any existing flows being mapped to the PC5 DRB and/or of any existing flows being mapped to the Uu DRB. In some embodiments, the QoS configurations may include one or more QoS parameters. In some embodiments, the one or more QoS parameters may include priority index, bit rate, packet error rate, latency, packet loss, and/or jitter. In some embodiments, comparing the PC5 DRB and the Uu DRB may consider free capacity or resources on the PC5 DRB and/or free capacity or resources on the Uu DRB.

In some embodiments, the determined PC5 DRB may be a PC5 DRB that is mapped or associated with the Uu DRB that carries the Uu QoS flow. In some embodiments, the determined PC5 DRB may be a PC5 DRB that is associated with similar QoS parameters as the Uu DRB that carries the Uu QoS flow. In some embodiments, the determined PC5 DRB may be a PC5 DRB that is able to achieve similar QoS satisfaction as the Uu DRB that carries the Uu QoS flow. In some embodiments, whether the PC5 DRB is able to achieve similar QoS satisfaction as the Uu DRB that carries the Uu QoS flow may be determined based on how much free sources each of the PC5 DRB and the Uu DRB are able to provide and/or the priority orders of the PC5 DRB and the Uu DRB.

In some embodiments, the method may further include starting or re-starting a timer when one or more reflective mapping relations for the PC5 DRB are established, changed, or reconfigured, and the reflective mapping relations may be valid for the PC5 DRB while the timer is running and invalid when the timer is expired.

In some embodiments, the received DL packet may include a header, and the one or more reflective QoS indicators may be added to the header of the DL packet. In some embodiments, the DL packet may be a service data adaptation protocol (SDAP) packet data unit (PDU), and the one or more reflective QoS indicators may be added to an SDAP header of the SDAP PDU.

In some embodiments, the method may further include receiving an uplink (UL) packet transmitted by the remote UE on the PC5 link in the PC5 QoS flow. In some embodiments, the relay UE may have a Uu link with a network node (504), the received DL packet may have been transmitted by the network node on the Uu link in a Uu QoS flow, and the method may further include transmitting the UL packet on the Uu link in the Uu QoS flow to the network node.

In some embodiments, the relay UE have a second PC5 link with a second relay UE, and the received DL packet may have been transmitted by the second relay UE on the second PC5 link in a second PCF QoS flow. In some embodiments, the method may further include receiving an uplink (UL) packet transmitted by the remote UE on the PC5 link in the PC5 QoS flow and transmitting the UL packet on the second PC5 link in the second PC5 QoS flow to the second relay UE. In some embodiments, the method may further include one or more of: deriving one or more mapping relations from the received DL packet, applying the one or more derived mapping relations to map the UL packet to the second PC5 QoS flow and transmit the UL packet on the second PC5 link to the second relay UE, using the derived one or more mapping relations to determine a PC5 QoS Flow Identifier (PFI) for the received DL packet, and determining a PC5 data radio bearer (DRB), and the determined PC5 DRB may be used to carry the PC5 QoS flow.

In some embodiments, the remote UE and the relay UE may be UEs on a path containing multiple PC5 link hops, the method may further include the relay UE receiving UE capability indicators transmitted by each of the other UEs on the path, and the UE capability indicators may indicate whether the UE supports reflective QoS on a PC5 link. In some embodiments, the method may further include using the received UE capability indicators to determine that all of the UEs on the path support reflective QoS on a PC5 link and adding the one or more reflective QoS indicators to the DL packet in response to determining that all of the UEs on the path support reflective QoS on a PC5 link.

In some embodiments, the remote UE and the relay UE may be UEs on a relay path segment containing multiple PC5 link hops, the method may further include the relay UE receiving UE capability indicators transmitted by each of the other UEs on the relay path segment, and the UE capability indicators may indicate whether the UE supports reflective QoS on a PC5 link. In some embodiments, the method may further include using the received UE capability indicators to determine that all of the UEs on the relay path segment support reflective QoS on a PC5 link and adding the one or more reflective QoS indicators to the DL packet in response to determining that all of the UEs on the relay path segment support reflective QoS on a PC5 link. In some embodiments, the relay path segment may be one part of an end to end connection between two remote UEs.

In some embodiments, the method may further include, for a UE to network relay, maintaining a mapping table between PC5 QoS Flow Identifiers (PFIs) and QoS Flow Identifiers (QFIs). In some embodiments, the method may further include, for UE to UE relay, maintaining a mapping table between QoS Flow Identifiers (QFIs) of a hop and QFIs of another hop. In some embodiments, the method may further include, for UE to UE relay, using the same QoS Flow Identifiers (QFIs) for all interconnected flows between two hops.

Another aspect of the invention may provide a relay user equipment (UE) adapted to receive a downlink (DL) packet, add one or more reflective quality-of-service (QoS) indicators to the DL packet, thereby creating a modified DL packet, and transmit the modified DL packet containing the one or more reflective QoS indicators on a PC5 link in a PC5 QoS flow to a remote UE (501).

Still another aspect of the invention may provide a method performed by a remote user equipment (UE) that has a PC5 link with a relay UE (502). The method may include receiving a downlink (DL) packet transmitted by the relay UE on the PC5 link in a quality-of-service (QoS) flow, and the DL packet may contain one or more reflective QoS indicators. The method may include using the one or more reflective QoS indicators to derive one or more mapping relations. The method may include applying the one or more derived mapping relations to map an uplink (UL) packet to the QoS flow and transmit the UL packet on the PC5 link.

In some embodiments, a header of the DL packet may contain the one or more reflective QoS indicators. In some embodiments, the DL packet may be a service data adaptation protocol (SDAP) packet data unit (PDU), and the header may be an SDAP header.

In some embodiments, the one or more reflective QoS indicators may include a QoS Flow Identifier (QFI), a data radio bearer (DRB) mapping indication (RDI), and/or a reflective QoS indication (RQI).

In some embodiments, the PC5 link may be a sidelink. In some embodiments, the sidelink may be a New Radio sidelink. In some embodiments, the sidelink may be a Long Term Evolution sidelink.

In some embodiments, the UL packet may be an upper layer packet, and the one or more derived mapping relations may include a mapping between upper layer packets and service data flows. In some embodiments, the one or more derived mapping relations may include a mapping between service data flows and data radio bearers.

In some embodiments, the method may further include transmitting a UE capability indicator that indicates whether the remote UE supports reflective QoS on a PC5 link. In some embodiments, the method may further include receiving a UE capability indicator that indicates whether the relay UE supports reflective QoS on a PC5 link.

In some embodiments, the method may further include transmitting information indicating whether the remote UE will adopt or allow reflective QoS for each of one or more services.

Yet another aspect of the invention may provide a remote user equipment (UE). The remote UE may be adapted to receive a downlink (DL) packet transmitted by a relay UE on a PC5 link in a quality-of-service (QoS) flow, and the DL packet may contain one or more reflective QoS indicators. The remote UE may be adapted to use the one or more reflective QoS indicators to derive one or more mapping relations. The remote UE may be adapted to apply the one or more derived mapping relations to map an uplink (UL) packet to the QoS flow and transmit the UL packet on the PC5 link.

Still another aspect of the invention may provide a method performed by a network node that has a Uu link with a relay UE. The method may include receiving a UE capability indicator that indicates whether the relay UE supports reflective quality-of-service (QoS) on a PC5 link. The method may include receiving a UE capability indicator that indicates whether a remote UE (501) supports reflective QoS on a PC5 link. The method may include, in response to determining that the UE capability indicators indicate that both the remote UE and the relay UE support reflective QoS on a PC5 link, transmitting a downlink (DL) packet on the Uu link. The DL packet may contain information configured to apply reflective QoS on the Uu link between the network node and the relay UE and on a PC5 link between the remote UE and the relay UE.

In some embodiments, the information configured to apply reflective QoS on the Uu link between the network node and the relay UE and on a PC5 link between the remote UE and the relay UE may include a Reflective QoS Indication (RQI) and/or a QoS Flow Identifier (QFI). In some embodiments, the method may further include, in response to determining that the UE capability indicators do not indicate that both the remote UE and the relay UE support reflective QoS on a PC5 link and determining that the relay UE supports reflective QoS on the Uu link, transmitting a DL packet on the Uu link, and the DL packet may contain information configured to apply reflective QoS on only the Uu link between the network node and the relay UE.

Yet another aspect of the invention may provide a network node. The network node may be adapted to receive a UE capability indicator that indicates whether a relay UE (502) supports reflective quality-of-service (QoS) on a PC5 link. The network node may be adapted to receive a UE capability indicator that indicates whether a remote UE (501) supports reflective QoS on a PC5 link. The network node may be adapted to, in response to determining that the UE capability indicators indicate that both the remote UE and the relay UE support reflective QoS on a PC5 link, transmit a downlink (DL) packet on a Uu link between the network node and the relay node. The DL packet may contain information configured to apply reflective QoS on the Uu link between the network node and the relay UE and on a PC5 link between the remote UE and the relay UE.

Still another aspect of the invention may provide a computer program including instructions for adapting an apparatus to perform any of the methods set forth above. Yet another aspect of the invention may provide a carrier containing the computer program, and the carrier may be one of an electronic signal, optical signal, radio signal, or compute readable storage medium.

Still another aspect of the invention may provide an apparatus including processing circuitry and a memory. The memory containing instructions executable by the processing circuitry, whereby the apparatus is operative to perform any of the methods set forth above. Yet another aspect of the invention may provide an apparatus adapted to any of the methods set forth above.

Still another aspect of the invention may provide any combination of the aspects set forth above.

BRIEF DESCRIPTION OF THE DRAWINGS

The accompanying drawings, which are incorporated herein and form part of the specification, illustrate various embodiments.

DETAILED DESCRIPTION

In this application, the term "node" can be a network node or a user equipment (UE). Examples of network nodes include, but are not limited to, a NodeB, a base station (BS), a multi-standard radio (MSR) radio node such as a MSR BS, an eNodeB, a gNodeB, a Master eNB (MeNB), a Secondary eNB (SeNB), integrated access backhaul (IAB) node, network controller, radio network controller (RNC), base station controller (BSC), relay, donor node controlling relay, base transceiver station (BTS), Central Unit (e.g. in a gNB), Distributed Unit (e.g. in a gNB), Baseband Unit, Centralized Baseband, C-RAN, access point (AP), transmission points, transmission nodes, remote radio unit (RRU), remote radio head (RRH), nodes in distributed antenna system (DAS), core network node (e.g. MSC, MME, etc.), O&M, OSS, SON, positioning node (e.g. E-SMLC).

In this application, the term "user equipment" or "UE" is a non-limiting term that refers to any type of wireless device communicating with a network node and/or with another UE in a cellular or mobile communication system. Examples of UEs include, but are not limited to, a target device, a device to device (D2D) UE, a vehicular to vehicular (V2V), a machine type UE, a machine type communication (MTC) UE, a UE capable of machine to machine (M2M) communication, a PDA, a Tablet, a mobile terminal(s), a smart phone, laptop embedded equipment (LEE), laptop mounted equipment (LME), and USB dongles.

In this application, the terms "radio network node," "network node," and "NW node" is generic terminology that refers to any kind of network node including but not limited to a base station, a radio base station, a base transceiver station, a base station controller, a network controller, an evolved Node B (eNB), a Node B, a gNodeB (gNB), a relay node, an access point (AP), a radio access point, a Remote Radio Unit (RRU), a Remote Radio Head (RRH), a Central Unit (e.g. in a gNB), a Distributed Unit (e.g. in a gNB), a Baseband Unit, a Centralized Baseband, and a C-RAN.

In this application, the term "radio access technology" or "RAT" may refer to any RAT including, for example and without limitation, UTRA, E-UTRA, narrow band internet of things (NB-IoT), WiFi, Bluetooth, next generation RAT, New Radio (NR), 4G, and 5G. Any of the equipment denoted by the terms "node," "network node," or "radio network node" may be capable of supporting a single or multiple RATs.

Embodiments are described in the context of New Radio (NR) (e.g., the remote UE and the relay UE are deployed in a same or different NR cell). However, the embodiments are also applicable to other relay scenarios (e.g., where the link between remote UE and relay UE may be based on Long Term Evolution (LTE) sidelink or NR sidelink and/or the Uu connection between relay UE and base station may be LTE Uu or NR Uu). Some embodiments are applicable to Layer 3 (L3) based relay scenarios.

Figure 1:
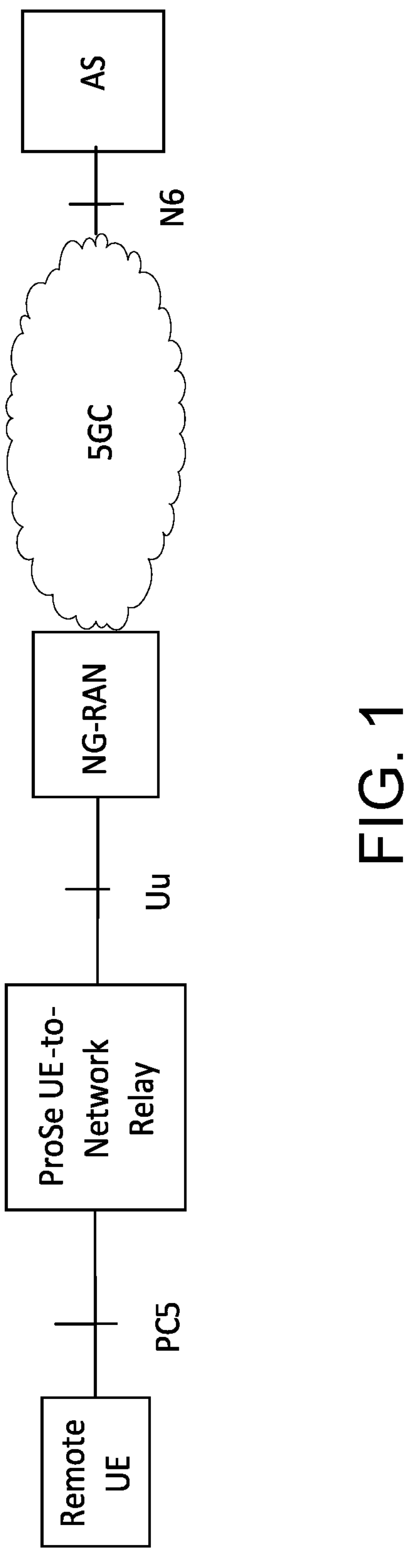
FIG. 1 illustrates an architecture model using a PreSe 5G UE-Network Relay in TR 23.752.
Figure 2:
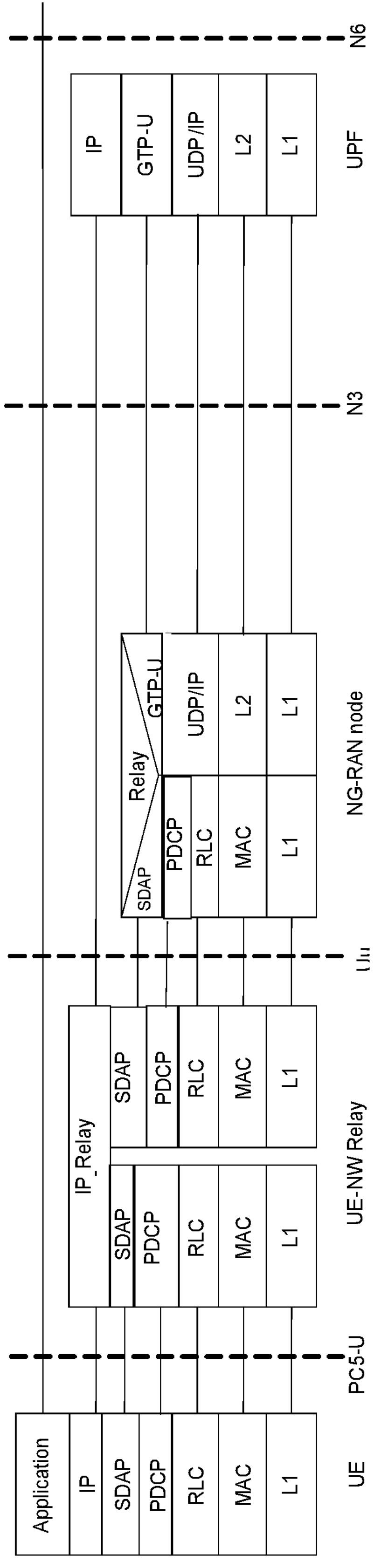
FIG. 2 illustrates the protocol stack for ProSe 5G UE-to-Network Relay in TR 23.752.

The protocol stack for Layer-3 UE-to-Network Relays is shown in FIG. 2. The ProSe 5G UE-to-Network Relay shall relay unicast traffic (uplink (UL) and downlink (DL)) between the Remote UE and the network. The ProSe UE-to-Network Relay shall provide generic function that can relay any Internet Protocol (IP) traffic. One-to-one Direct Communication is used between Remote UEs and ProSe 5G UE-to-Network Relays for unicast traffic.

Figure 3:
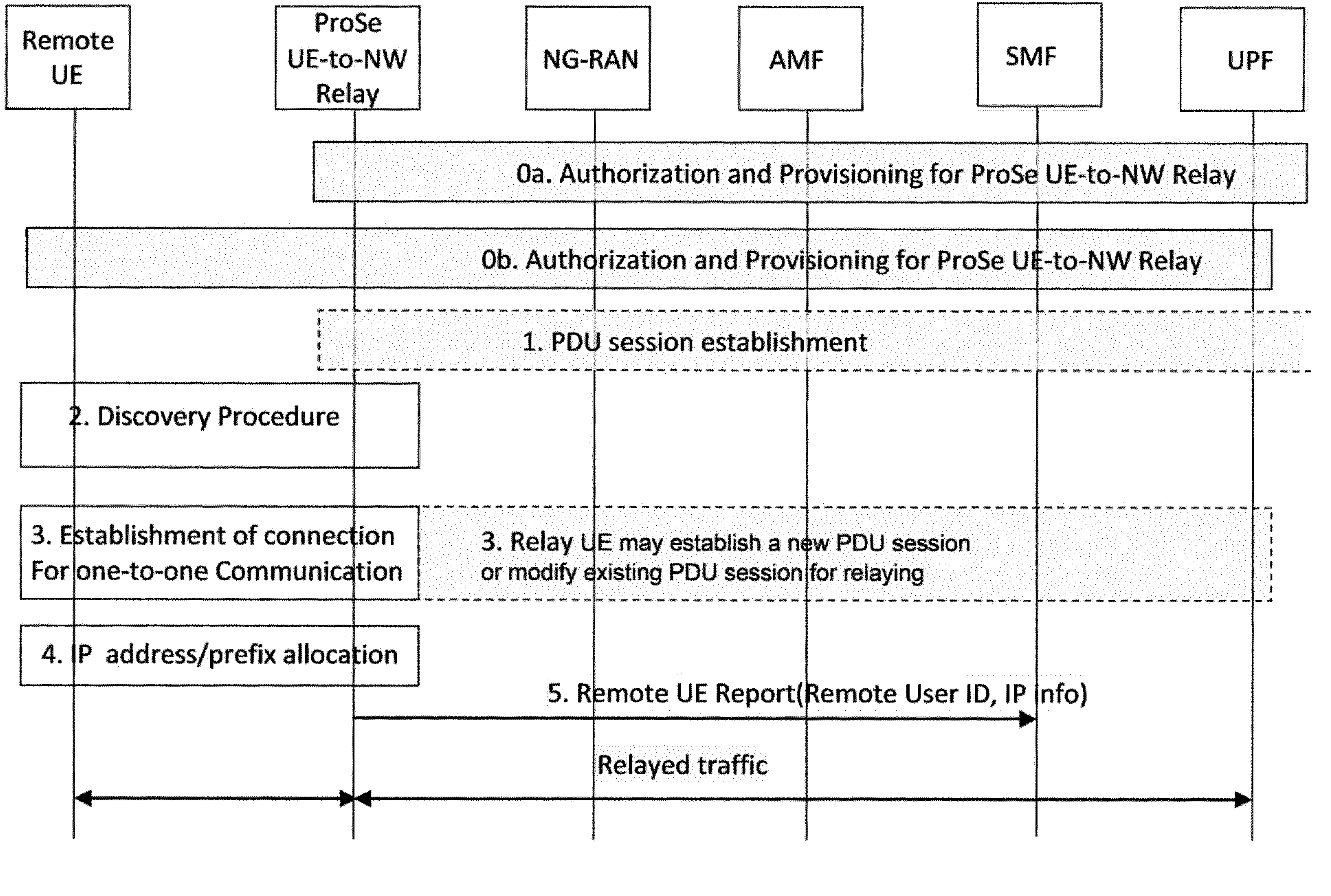
FIG. 3 is a message flow diagram illustrating steps performed by, among other entities, a ProSe UE-to-Network Relay.
Figure 4:
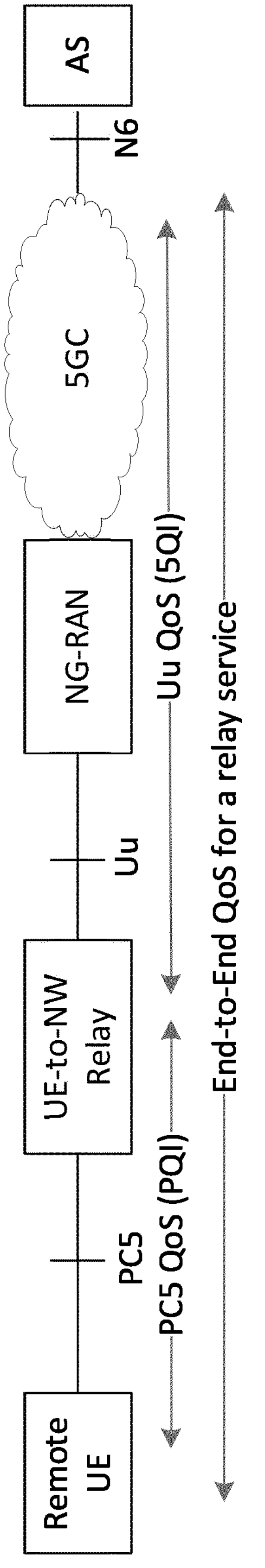
FIG. 4 illustrates the End-to-End QoS split for Layer 3 UE-to-Network Relay solution in TR 23.752.

FIG. 3 is a message flow diagram illustrating steps performed by, among other entities, a ProSe UE-to-Network Relay. Hop-by-hop security is supported in the PC5 link and Uu link. If there are requirements beyond hop-by-hop security for protection of Remote UE's traffic, security over IP layer needs to be applied. A ProSe 5G UE-to-Network Relay capable UE may register to the network (if not already registered) and establish a protocol data unit (PDU) session enabling the necessary relay traffic, or the ProSe 5G UE-to-Network Relay capable UE may need to connect to additional PDU session(s) or modify the existing PDU session in order to provide relay traffic towards Remote UE(s). PDU session(s) supporting UE-to-Network Relay shall only be used for Remote ProSe UE(s) relay traffic.

The steps shown in FIG. 3 are described below.

0. During the Registration procedure, Authorization and provisioning is performed for the ProSe UE-to-NW relay and Remote UE.
1. The ProSe 5G UE-to-Network Relay may establish a PDU session for relaying with default PDU session parameters received in step 0 or pre-configured in the UE-to-NW relay (e.g., Single-Network Slice Selection Assistance Information (S-NSSAI), data network name (DNN), SSC mode). In case of IPv6, the ProSe UE-to-Network Relay obtains the IPv6 prefix via prefix delegation function from the network.
2. Based on the Authorization and provisioning in step 0, the Remote UE performs discovery of a ProSe 5G UE-to-Network Relay. As part of the discovery procedure, the Remote UE learns about the connectivity service the ProSe UE-to-Network Relay provides.
3. The Remote UE selects a ProSe 5G UE-to-Network Relay and establishes a connection for One-to-one ProSe Direct Communication.

If there is no PDU session satisfying the requirements of the PC5 connection with the remote UE (e.g., S-NSSAI, DNN, QoS), the ProSe 5G UE-to-Network Relay initiates a new PDU session establishment or modification procedure for relaying.

4. IPv6 prefix or IPv4 address is allocated for the remote UE.
5. The ProSe 5G UE-to-Network Relay sends a Remote UE Report (Remote User ID, IP info) message to the Session Management Function (SMF) for the PDU session associated with the relay. The Remote User ID is an identity of the Remote UE user (provided via User Info) that was successfully connected in step 3. The SMF stores the Remote User IDs and the related IP info in the ProSe 5G UE-to-Network Relay's for the PDU connection associated with the relay. For IP info the following principles apply:

a) for IPv4, the UE-to-network Relay shall report Transmission Control Protocol (TCP)/User Datagram Protocol (UDP) port ranges assigned to individual Remote UE(s) (along with the Remote User ID);
b) for IPv6, the UE-to-network Relay shall report IPv6 prefix(es) assigned to individual Remote UE(s) (along with the Remote User ID).

The Remote UE Report message shall be sent when the Remote UE disconnects from the ProSe 5G UE-to-Network Relay (e.g., upon explicit layer-2 link release or based on the absence of keep alive messages over PC5) to inform the SMF that the Remote UE(s) have left.

In the case of Registration Update procedure involving SMF change the Remote User IDs and related IP info corresponding to the connected Remote UEs are transferred to the new SMF as part of SM context transfer for the ProSe 5G UE-to-Network Relay. In order for the SMF to have the Remote UE(s) information, the Home Public Land Mobile Network (HPLMN) and the Visit Home Public Land Mobile Network (VPLMN) where the ProSe 5G UE-to-Network Relay is authorized to operate, needs to support the transfer of the Remote UE related parameters in case the SMF is in the HPLMN. When Remote UE(s) disconnect from the ProSe UE-to-Network Relay, it is up to implementation how relaying PDU sessions are cleared/disconnected by the ProSe 5G UE-to-Network Relay.

After being connected to the ProSe 5G UE-to-Network Relay, the Remote UE keeps performing the measurement of the signal strength of the discovery message sent by the ProSe 5G UE-to-Network Relay for relay reselection.

The solution can also work when the ProSe 5G UE-to-Network relay UE connects in Evolved Packet System (EPS) using Long Term Evolution (LTE).

Figure 5:
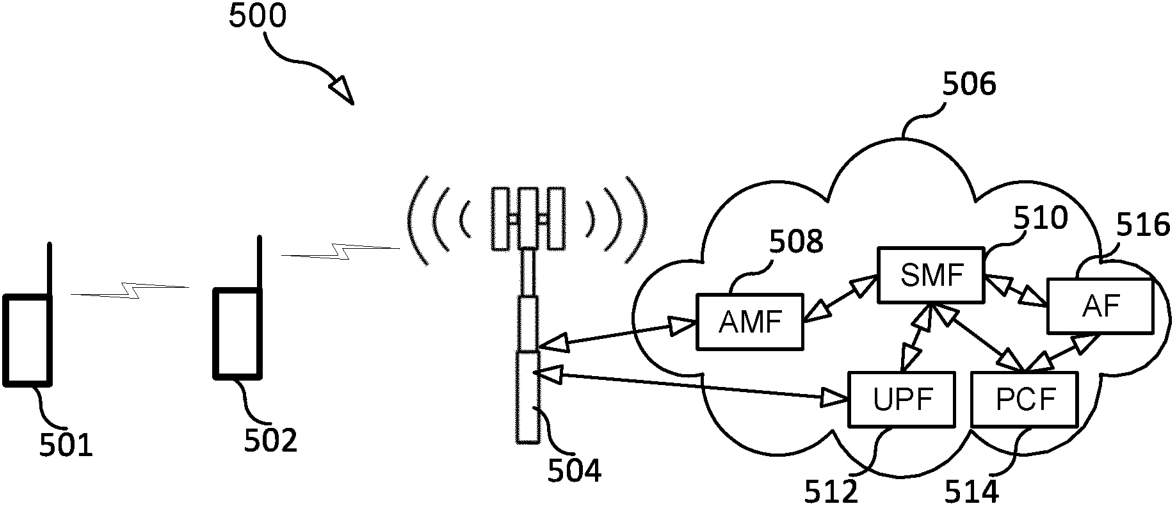
FIG. 5 illustrates a system according to an embodiment.
Figure 6:
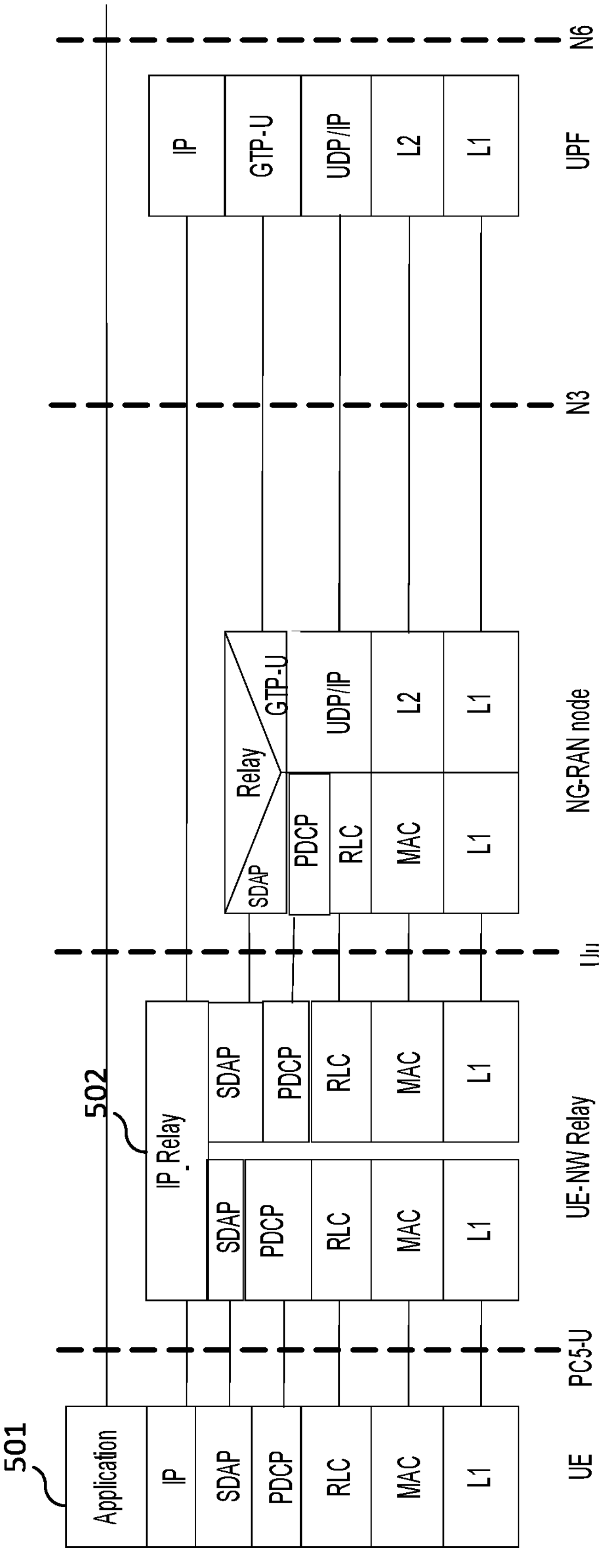
FIG. 6 illustrates a protocol stack for the Layer-3 UE-to-Network (UE-NW) Relay according to an embodiment.

FIG. 5 illustrates a system 500 according to some embodiments. The system 500 may include a first UE 501 (referred to herein as the "remote" UE), a second UE 502 (referred to herein as the "relay" UE), a network node 504, and/or a core network 506. In some embodiments, as shown in FIG. 5, the second UE 502 may function as an L3 UE-to-Network (U2N) relay. In some embodiments, the second UE 502 may function as a UE-to-UE (U2U) relay. In some embodiments, the network node 504 may be a radio access network (RAN) access point (AP). In some embodiments, the RAN AP may be a base station such as, for example and without limitation, a Next Generation (NG) RAN (NG-RAN) base station (denoted "gNB"). In some embodiments, the core network 506 may be, for example and without limitation, a 5G core network (5GC). In some embodiments, as shown in FIG. 5, the core network 506 (e.g., 5GC) may include an Access and Mobility Function (AMF) 508, a Session Management Function (SMF) 510, a User Plane Function (UPF) 512, a Policy Control Function (PCF) 514, and/or an Application Function (AF) 516. FIG. 6 shows the protocol stack for the remote UE 501 and UE-NW relay 502.

In some embodiments, reflective quality-of-service (QoS) may be applied to the SideLink (SL) in case of SL relay. In some embodiments, a remote UE 501 connecting to an SL relay UE 502, which further connects to a network node 504 (e.g., gNB) or another UE, may be allowed to apply reflective QoS on one or multiple SL hops of the end to end (E2E) connection (between the source remote UE and the destination node, which may be the network node 504 or a destination remote UE). In other words, instead of using Radio Resource Control (RRC) signaling (e.g., PC5-RRC) to signal a mapping relation between two UEs or between a UE and a network node, the QoS mapping relation may be reflected via in-band indicators in the Service Data Adaption Protocol (SDAP) header of a data protocol data unit (PDU). In some embodiments, a relay UE 502 that further connects to a network node 504 may be a U2N relay, and a relay UE 502 that further connects to another UE may be a U2U relay.

In some embodiments, the QoS mapping relation/rule may include be (i) mapping between upper layer packets (e.g., IP packets, IPSec PDU, Ethernet frame, WiFi PDU, etc.) and service data flows (SDFs) and/or (ii) mapping between SDFs and data radio bearers (DRBs).

In some embodiments, the remote UE 501 may receive one or more packets (e.g., SDAP PDUs) containing one or more reflective QoS indicators (e.g., QoS Flow Identifier (QFI), Reflective QoS flow to DRB mapping Indication (RDI), and/or Reflective QoS Indication (RQI) in the SDAP header) over SL hops in one direction. In some embodiments, the remote UE 501 may derive a mapping relation (e.g., a mapping between upper layer packets and SDFs or a mapping SDFs and DRBs). In some embodiments, the remote UE 501 may apply the same mapping relation for packets transmitted on the same SL hops in the reverse direction. In some embodiments, a UE capability indicator indicates whether the UE supports reflective QoS on SL. In some embodiments, the UE capability indicator may be a bit. However, this is not required, and, in some alternative embodiments, the UE capability indicator may be more than one bit (e.g., two bits, four bits, a byte, etc.).

In some embodiments, for a remote UE 501 connecting to a relay UE 502 as a U2N relay, in order to apply reflective QoS on the SL between the remote UE 501 and the relay UE 502, both the remote UE 501 and the relay UE 502 may need to support reflective QoS on the SL. In some embodiments, both the remote UE 501 and the relay UE 502 may exchange capability indicators, which are indicative of whether the UE supports reflective QoS on SL, between each other. In some embodiments, the relay UE 502 (or the remote UE 501 and the relay UE 502) may provide the capability indicator to the network node 504. In some embodiments, the relay UE 502 may provide the reflective QoS capability indicator on the Uu link to the network node 504. In some embodiments, the network node 504 may decide whether to apply reflective QoS for the relay UE 502 and/or the remote UE 501. In some embodiments, if both the remote UE 501 and the relay UE 502 support reflective QoS, the network node 504 may decide to apply reflective QoS on the full path (e.g., including the first hop and the second hop). In some embodiments, if only the relay UE 502 (and not the remote UE 501) supports reflective QoS, the network node 504 may decide to only apply reflective QoS on the second hop (e.g., the Uu). In some embodiments, if only the remote UE 501 (or neither the remote UE 501 nor the relay UE 502) supports reflective QoS, the network node 504 may decide to not apply reflective QoS on either of the first and second hops.

In some embodiments, the remote UE 501 may additionally or alternatively inform the relay UE 502 of whether the remote UE 501 will adopt or allows reflective QoS for certain service(s) to be relayed. In some embodiments, the one or more services may be represented by, for example, relay service code or service name. In some embodiments, the relay UE 502 may forward the information on whether the remote 501 will adopt or allows reflective QoS for certain service(s) to the network node 504. In some embodiments, the reflective QoS over Uu hop at the relay UE 502 may only be configured for the relayed services when reflective QoS will be adopted or is allowed over PC5 hop at the remote UE 501 for those services.

Figure 7:
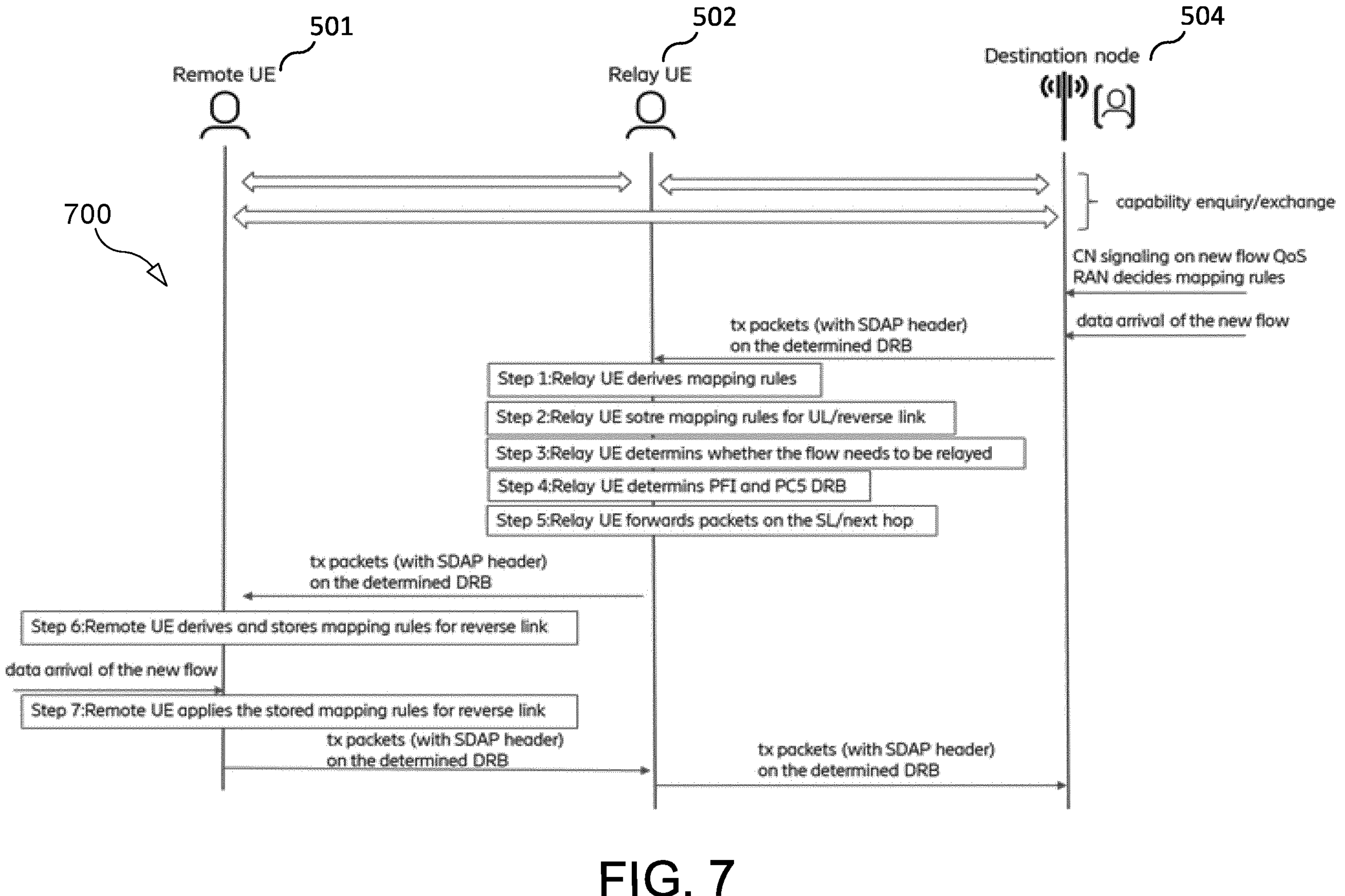
FIG. 7 is a message flow diagram illustrating a message flow according to an embodiment.

FIG. 7 is a message flow diagram illustrating a process 700 according to some embodiments. As shown in FIG. 7, in some embodiments, the process 700 may begin with an exchange of capability indicators between one or more of the remote UE 501, relay UE 502, and destination node (e.g., network node 504). In some embodiments, the capability indicators may indicate whether the remote UE 501 and the relay UE 502 supports reflective QoS on SL. In some embodiments, this step may also include the exchange of information on whether the remote UE 501 will adopt or allows reflective QoS for certain service(s) to be relayed.

In some embodiments, reflective QoS may alternatively or additionally be configured per data radio bearer (DRB). If reflective QoS is applied for a DRB in Uu, the relay UE 502 may perform the one or more of the following steps to handle QoS mapping. In some embodiments, as shown in FIG. 7, the process 700 may include a step 1 in which the relay UE 502 derives the mapping relation(s) for the corresponding Uu DRB from the DL packets (e.g., DL packets of a new flow) via the SDAP headers of the DL packets. In some embodiments, as shown in FIG. 7, the process 700 may include a step 2 in which the relay UE 502 stores the mapping relations for UL packets which will be received from the remote UE 501.

In some embodiments, as shown in FIG. 7, the process 700 may include a step 3 in which the relay UE 502 determines if the DL packets are for itself or for a linked remote UE 501. In some embodiments, the relay UE 502 may make the determination based on the target IP address of the DL packets. In some embodiments, one or more QFIs may be reserved for relaying purposes, and the relay UE 502 may additionally or alternatively make the determination based on a QFI.

In some embodiments, as shown in FIG. 7, the process 700 may include a step 4 in which, based on the mapping relations, the relay UE 502 determines the PC5 QoS Flow Identifier (PFI) for DL packets (e.g., DL packets of the new flow) which need to be relayed to the remote UE 501. In some embodiments, the determination is performed based on a configured/provisioned table (e.g., a mapping table between PFIs and QFIs) or a configured/provisioned rule.

In some embodiments, step 4 may include the relay UE 502 determining a PC5 DRB that is used to carry the DL packets (e.g., DL packets of a new flow indicated in the DL SDAP header) to the remote UE 501. In some embodiments, the relay UE 502 may consider one or more of the following criteria to compare a PC5 DRB and the Uu DRB carrying the new flow: (i) QoS configuration of the DRB, (ii) QoS configuration of any existing flow that is being mapped to the DRB, and (iii) free capacity or resources of the DRB. For any of the criteria, the QoS configuration may include one or more QoS parameters such as, for example and without limitation, priority index, bit rate, packet error rate, latency, packet loss, and/or jitter.

In some embodiments, for the new flow, if a PC5 DRB is mapped or associated with the Uu DRB that carries the new flow, the relay UE 502 may use the PC5 DRB. In some embodiments, for the new flow, if a PC5 DRB is associated with similar QoS parameters as the Uu DRB that carries the new flow, the relay UE 502 may use the PC5 DRB. In some embodiments, for the new flow, if a PC5 DRB is carrying a flow with the similar QoS parameters as one existing flow on the Uu DRB that also carries the new flow, the relay UE 502 may use the PC5 DRB. In some embodiments, if a PC5 DRB is able to achieve similar QoS satisfaction as the Uu DRB carrying the new flow, the relay UE 502 may use the PC5 DRB.

In some embodiments, the relay UE 502 may determine whether the PC5 DRB is able to achieve similar QoS satisfaction as the Uu DRB carrying the new flow based on how much free sources each DRB can provide and/or the priority order of the DRB.

In some embodiments, as shown in FIG. 7, the process 700 may include a step 5 in which the relay UE 502 creates the PC5 SDAP header for packets (e.g., packets of the new flow) and forwards the packets to the remote UE 501 via the determined PC5 DRB. In some embodiments, the relay UE 502 may add reflective QoS indicators (e.g., RDI and RQI) in the PC5 SDAP header with the values copied from the corresponding DL SDAP header.

In some embodiments, as shown in FIG. 7, the process 700 may include a step 6 in which the remote UE 501 receives packets, derives the mapping relations (e.g., upper layer packets to flows and/or flows to DRBs) for the PC5 DRB, and stores the mapping relations. In some embodiments, as shown in FIG. 7, the process 700 may include a step 7 in which, upon arrival of upper layer packets for the new flow, the remote UE 501 applies the same mapping relations to map these packets to the same flow and the same PC5 DRB in the reverse direction on the SL.

In some embodiments, for a path containing multiple SL hops (e.g., multiple hop U2U), UEs on the path may exchange their capability bits on reflective QoS between each other. In some embodiments, in order to apply reflective QoS on the path, all UEs on the path may need to support reflective QoS. In some alternative embodiments, a relay path segment (e.g., one part of the E2E connection between two remote UEs) may apply reflective QoS, while the rest segment does not apply. In this case, all UEs on a relay path segment may need to support reflective QoS in order to make the full segment to apply reflective QoS. In some embodiments, if there is at least one UE that does not support reflective QoS on a relay path segment, the relay path segment would not be able to apply reflective QoS.

In some embodiments, for a relay UE 502 on an SL path, in case the relay UE 502 receives a packet containing reflective QoS indicators from an upper hop, the relay UE 502 may apply actions similar to those discussed above with respect to the handling of QoS mapping (e.g., one or more of steps 1-5).

In some embodiments, with reflective QoS on the relay path (on both the first and the second hops), for U2N relay, a mapping table between PFIs and QFIs may be maintained at the relay UE 502. In some embodiments, for U2U relay, a mapping table between QFIs of a hop and QFIs of another hop may be maintained. In some alternative embodiments, for a U2U relay, two hops may use same QFIs for all inter-connected flows between the hops. In some embodiments, the table may be configured/provisioned at the relay UE 502. In some embodiments, based on the table, for U2N relay, the relay UE 502 may maintain a proper mapping between PC5 QoS parameters and Uu QoS parameters so that the E2E QoS between the remote UE 501 and the destination node can be achieved.

In some embodiments, a timer is configured/provisioned for the E2E connection between the remote UE 501 and the destination node. In some embodiments, the timer may be configured per DRB. In some embodiments, the timer may be started/restarted every time when the reflective QoS mapping rules of the DRB are established, changed, or reconfigured. In some embodiments, the same mapping rules may be valid to the DRB while the timer is running. In some embodiments, the mapping rules may become invalid when the timer is expired. In some embodiments, in case the E2E connection contains multiple hops, on each hop, there may be a separate timer configured/provisioned for the per hop DRB associated with the E2E connection.

In some embodiments, the signaling alternatives described above may include one or more of the following: (A) Non-Access Stratum (NAS) Radio Resource Control (RRC) signaling for signaling between UE and the core network (CN) entity (e.g., SMF or PCF), (B) for signaling between relay UE 502 and the network node 504: (i) RRC signaling, (ii) Medium Access Control (MAC) channel emulator (CE), and/or (iii) L1 signaling such as physical random access channel (PRACH), physical uplink control channel (PUCCH), and/or physical downlink control channel (PDCCH), and/or (C) for signaling between remote UE 501 and relay UE 502: (i) RRC signaling (e.g., PC5-RRC), (ii) MAC CE, and (iii) L1 signaling such as SCI.

Figure 8:
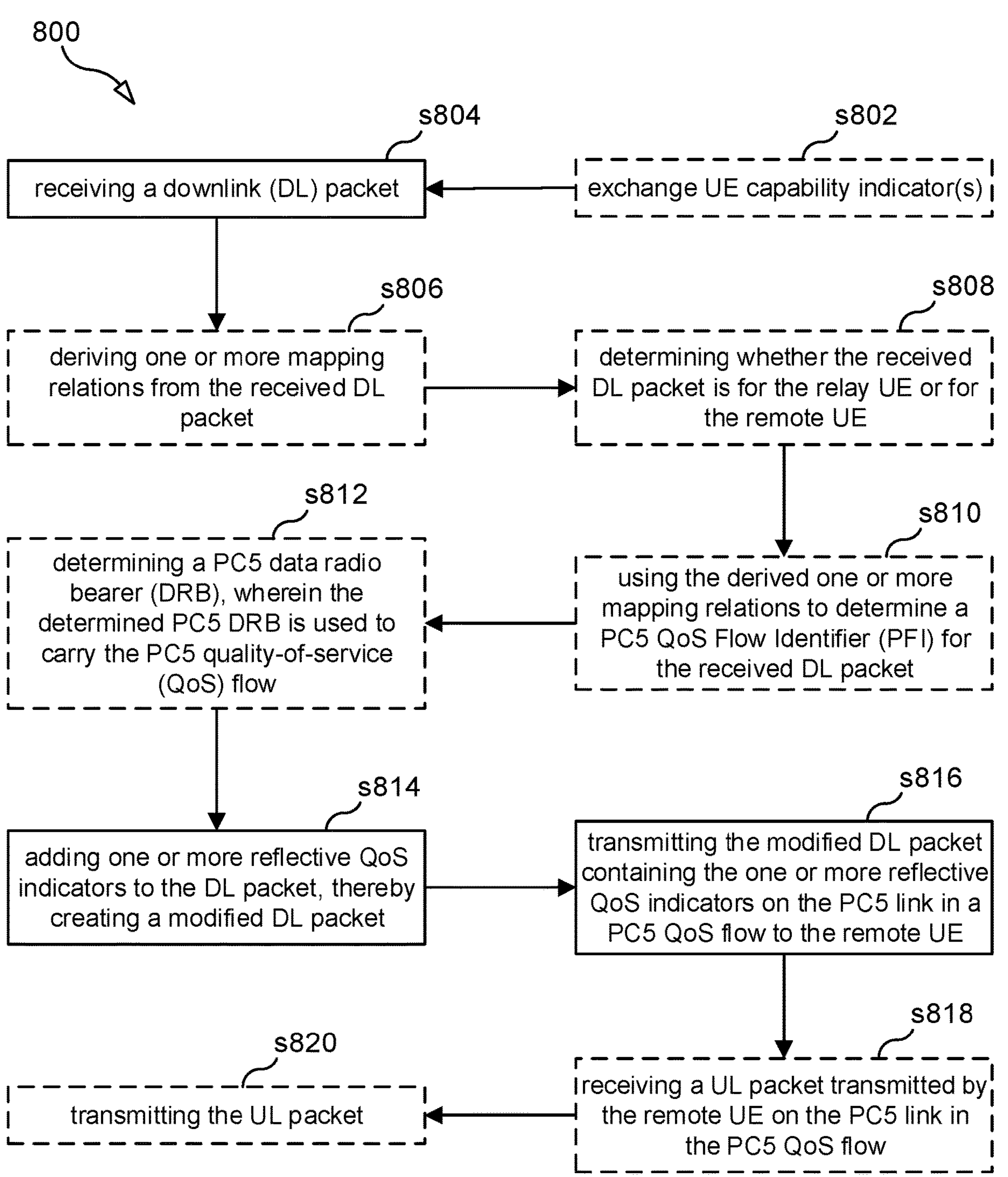
FIG. 8 is a flowchart illustrating a process according to some embodiments.

FIG. 8 illustrates a process 800 performed by the relay UE 502 that has a PC5 link with the remote UE 501 according to some embodiments. In some embodiments, the PC5 link may be a sidelink. In some embodiments, the sidelink may be a New Radio (NR) sidelink or a Long Term Evolution (LTE) sidelink.

In some embodiments, the process 800 may include an optional step 802 of exchanging UE capability indicator(s). In some embodiments, the optional step 802 may include the relay UE 502 receiving a UE capability indicator transmitted by the remote UE 501, and the UE capability indicator may indicate whether the remote UE 501 supports reflective QoS on a PC5 link. In some embodiments, the optional step 802 may include using the received UE capability indicator to determine whether the remote UE supports reflective QoS on a PC5 link. In some embodiments, the optional step 802 may include transmitting the UE capability indicator that indicates whether the remote UE 501 supports reflective QoS on a PC5 link to a network node 504 (e.g., if the relay UE 502 has a Uu link with network node 504) or a second relay UE (e.g., if more than one hop separates the relay UE 502 and the network node 504, and the relay UE 502 has a second PC5 link with the second relay UE). In some embodiments, the optional step 802 may additionally or alternatively include transmitting a UE capability indicator that indicates whether the relay UE 502 supports reflective QoS on a PC5 link to a network node 504 (e.g., if the relay UE 502 has a Uu link with network node 504) or a second relay UE (e.g., if more than one hop separates the relay UE 502 and the network node 504, and the relay UE 502 has a second PC5 link with the second relay UE).

In some embodiments, the optional step 802 may additionally or alternatively include receiving service information transmitted by the remote UE 501, and the service information may indicate whether the remote UE 501 will adopt or allow reflective QoS for each of one or more services. In some embodiments, the one or more services may be identified by, for example, a relay service code and/or a service name.

In some embodiments in which the remote UE 501 and the relay UE 502 are UEs on a path containing multiple PC5 link hops, the optional step 802 may include the relay UE receiving UE capability indicators transmitted by each of the other UEs on the path, and the UE capability indicators may indicate whether the UE supports reflective QoS on a PC5 link. In some embodiments, the optional step 802 may include using the received UE capability indicators to determine whether all of the UEs on the path support reflective QoS on a PC5 link.

In some embodiments in which the remote UE 501 and the relay UE 502 may be UEs on a relay path segment containing multiple PC5 link hops, the optional step 802 may further include the relay UE 502 receiving UE capability indicators transmitted by each of the other UEs on the relay path segment, and the UE capability indicators may indicate whether the UE supports reflective QoS on a PC5 link. In some embodiments, the optional step 802 may include using the received UE capability indicators to determine whether all of the UEs on the relay path segment support reflective QoS on a PC5 link. In some embodiments, the relay path segment may be one part of an end to end connection between two remote UEs.

In some embodiments, the process 800 may include a step 804 in which the relay UE 502 receives a downlink (DL) packet. In some embodiments, the relay UE 502 has a Uu link with the network node 504, and the received DL packet is transmitted by the network node 504 on the Uu link in a Uu QoS flow. In some alternative embodiments, the relay UE 502 has a second PC5 link with a second relay UE, and the received DL packet is transmitted by the second relay UE on the second PC5 link in a second PCF QoS flow.

In some embodiments, the process 800 may include an optional step 806 in which the relay UE 502 derives one or more mapping relations from the received DL packet. In some embodiments, the received DL packet may include a header, and the relay UE 502 may derive the one or more mapping relations using the header. In some embodiments, the DL packet may be a service data adaptation protocol (SDAP) packet data unit (PDU), and the relay UE 502 may derive the one or more mapping relations using an SDAP header of the SDAP PDU.

In some embodiments, the process 800 may include an optional step 808 in which the relay UE 502 determines whether the received DL packet is for the relay UE 502 or for the remote UE 501. In some embodiments, the received DL packet may include a target Internet Protocol (IP) address, and the target IP address may be used to determine whether the received DL packet is for the relay UE 502 or for the remote UE 501. In some embodiments, the received DL packet may include a QoS Flow Identifier (QFI), and the QFI may be used to determine whether the received DL packet is for the relay UE 502 or for the remote UE 501.

In some embodiments, the process 800 may include an optional step 810 in which the relay UE 502 uses the derived one or more mapping relations to determine a PC5 QoS Flow Identifier (PFI) for the received DL packet. In some embodiments (e.g., embodiments in which the relay UE 502 has a Uu link with the network node 504 and the received DL packet is transmitted by the network node 504 on the Uu link in a Uu QoS flow), the received DL packet may include a QoS Flow Identifier (QFI), and the relay UE 502 may determine the PFI using the QFI of the received DL packet and a table that maps QFIs to PFIs. In some embodiments, the process 800 may include, for a UE to network relay, maintaining a mapping table between PC5 QoS Flow Identifiers (PFIs) and QoS Flow Identifiers (QFIs).

In some embodiments, the process 800 may additionally or alternatively include, for UE to UE relay, maintaining a mapping table between QoS Flow Identifiers (QFIs) of a hop and QFIs of another hop. In some embodiments, the process 800 may additionally or alternatively include, for UE to UE relay, using the same QoS Flow Identifiers (QFIs) for all interconnected flows between two hops.

In some embodiments, the process 800 may include an optional step 812 in which the relay UE 502 determines a PC5 data radio bearer (DRB), and the determined PC5 DRB may be used to carry a PC5 QoS flow between the relay UE 502 and the remote UE 501.

In some embodiments in which a Uu DRB carries the Uu QoS flow on the Uu link, determining the PC5 DRB may include comparing the PC5 DRB and the Uu DRB. In some embodiments, comparing the PC5 DRB and the Uu DRB may consider (i) the QoS configurations of the PC5 DRB and the Uu DRB, (ii) the QoS configurations of any existing flows being mapped to the PC5 DRB and/or of any existing flows being mapped to the Uu DRB, and (iii) free capacity or resources on the PC5 DRB and/or free capacity or resources on the Uu DRB. In some embodiments, the QoS configurations may include one or more QoS parameters. In some embodiments, the one or more QoS parameters may include priority index, bit rate, packet error rate, latency, packet loss, and/or jitter.

In some embodiments in which a Uu DRB carries the Uu QoS flow on the Uu link, the determined PC5 DRB may be a PC5 DRB that is mapped or associated with the Uu DRB that carries the Uu QoS flow. In some embodiments in which a Uu DRB carries the Uu QoS flow, the determined PC5 DRB may be a PC5 DRB that is associated with similar QoS parameters as the Uu DRB that carries the Uu QoS flow. In some embodiments in which a Uu DRB carries the Uu QoS flow, the determined PC5 DRB may be a PC5 DRB that is able to achieve similar QoS satisfaction as the Uu DRB that carries the Uu QoS flow. In some embodiments, whether the PC5 DRB is able to achieve similar QoS satisfaction as the Uu DRB that carries the Uu QoS flow may be determined based on how much free sources each of the PC5 DRB and the Uu DRB are able to provide and/or the priority orders of the PC5 DRB and the Uu DRB.

In some embodiments in which a second PC5 DRB carries the second QoS flow on the second PC5 link, determining the PC5 DRB may include comparing the PC5 DRB and the second PC5 DRB. In some embodiments, comparing the PC5 DRB and the second PC5 DRB may consider (i) the QoS configurations of the PC5 DRB and the second PC5 DRB, (ii) the QoS configurations of any existing flows being mapped to the PC5 DRB and/or of any existing flows being mapped to the second PC5 DRB, and (iii) free capacity or resources on the PC5 DRB and/or free capacity or resources on the second PC5 DRB. In some embodiments, the QoS configurations may include one or more QoS parameters.

In some embodiments in which a second PC5 DRB carries the second PC5 QoS flow on the second PC5 link, the determined PC5 DRB may be a PC5 DRB that is mapped or associated with the second PC5 DRB that carries the second PC5 QoS flow. In some embodiments in which a second PC5 DRB carries the second PC5 QoS flow, the determined PC5 DRB may be a PC5 DRB that is associated with similar QoS parameters as the second PC5 DRB that carries the second PC5 QoS flow. In some embodiments in which a second PC5 DRB carries the second PC5 QoS flow, the determined PC5 DRB may be a PC5 DRB that is able to achieve similar QoS satisfaction as the second PC5 DRB that carries the second PC5 QoS flow. In some embodiments, whether the PC5 DRB is able to achieve similar QoS satisfaction as the second PC5 DRB that carries the second PC5 QoS flow may be determined based on how much free sources each of the PC5 DRB and the second PC5 DRB are able to provide and/or the priority orders of the PC5 DRB and the second PC5 DRB.

In some embodiments, the process 800 (e.g., optional step 812) may include starting or re-starting a timer when one or more reflective mapping relations for the PC5 DRB are established, changed, or reconfigured, and the reflective mapping relations may be valid for the PC5 DRB while the timer is running and invalid when the timer is expired.

In some embodiments, the process 800 may include a step 814 in which the relay UE 502 adds one or more reflective quality-of-service (QoS) indicators to the DL packet, thereby creating a modified DL packet. In some embodiments, the received DL packet may include a header, and the relay UE 502 may add the one or more reflective QoS indicators to the header of the DL packet. In some embodiments, the DL packet may be a service data adaptation protocol (SDAP) packet data unit (PDU), and the relay UE 502 may add the one or more reflective QoS indicators to an SDAP header of the SDAP PDU. In some embodiments, the one or more reflective QoS indicators may include a QoS Flow Identifier (QFI), a data radio bearer (DRB) mapping indication (RDI), and/or a reflective QoS indication (RQI).

In some embodiments, adding the one or more reflective QoS indicators to the DL packet in step 814 may occur in response to the relay UE 502 determining that the remote UE 501 supports reflective QoS on a PC5 link in the optional step 802. In some embodiments in which the remote UE 501 and the relay UE 502 are UEs on a path containing multiple PC5 link hops, adding the one or more reflective QoS indicators to the DL packet in step 814 may occur in response to determining in the optional step 812 that all of the UEs on the path support reflective QoS on a PC5 link. In some embodiments in which the remote UE 501 and the relay UE 502 may be UEs on a relay path segment containing multiple PC5 link hops, adding the one or more reflective QoS indicators to the DL packet in step 814 may occur in response to determining in the optional step 812 that all of the UEs on the relay path segment support reflective QoS on a PC5 link.

In some embodiments, the process 800 may include a step 816 in which the relay UE 502 transmits the modified DL packet containing the one or more reflective QoS indicators on the PC5 link in a PC5 QoS flow to the remote UE 501. In some embodiments, the PC5 DRB determined in the optional step 812 may be used to carry the PC5 QoS flow.

In some embodiments, the process 800 may include an optional step 818 in which the relay UE 502 receives an uplink (UL) packet transmitted by the remote UE 501 on the PC5 link in the PC5 QoS flow. In some embodiments, the PC5 DRB determined in the optional step 812 may carry the PC5 QoS flow.

In some embodiments, the process 800 may include an optional step 820 in which the relay UE 502 transmits the received UL packet. In some embodiments in which the relay UE 502 has a Uu link with the network node 504 and the received DL packet is transmitted by the network node 504 on the Uu link in a Uu QoS flow, the optional step 820 may include the relay UE 502 applying the one or more mapping relations derived in the optional step 806 to map the UL packet to the Uu QoS flow and transmit the UL packet on the Uu link to the network node 506. In some alternative embodiments in which the relay UE 502 has a second PC5 link with a second relay UE and the received DL packet is transmitted by the second relay UE on the second PC5 link in a second PCF QoS flow, the optional step 820 may include the relay UE 502 transmitting the UL packet on the second PC5 link in the second PC5 QoS flow to the second relay UE.

In some alternative embodiments in which the relay UE 502 has a second PC5 link with a second relay UE and the received DL packet is transmitted by the second relay UE on the second PC5 link in a second PCF QoS flow, the method may one or more steps similar to the steps for an embodiment in which the relay UE 502 has a Uu link with a network node 504. For example, in some alternative embodiments in which the relay UE 502 has a second PC5 link with a second relay UE and the received DL packet is transmitted by the second relay UE on the second PC5 link in a second PCF QoS flow, the method may include one or more of: deriving one or more mapping relations from the received DL packet, applying the one or more derived mapping relations to map the UL packet to the second PC5 QoS flow and transmit the UL packet on the second PC5 link to the second relay UE, using the derived one or more mapping relations to determine a PC5 QoS Flow Identifier (PFI) for the received DL packet, determining a PC5 data radio bearer (DRB) used to carry the PC5 QoS flow, adding one or more reflective QoS indicators to the DL packet to create a modified packet, transmitting the modified DL packet on the PC5 link in a PC5 QoS flow to the remote UE, receiving a UL packet on the PC5 link in the PC5 QoS flow, and transmitting the UL packet on the second PC5 link in the second PC5 QoS flow.

Figure 9:
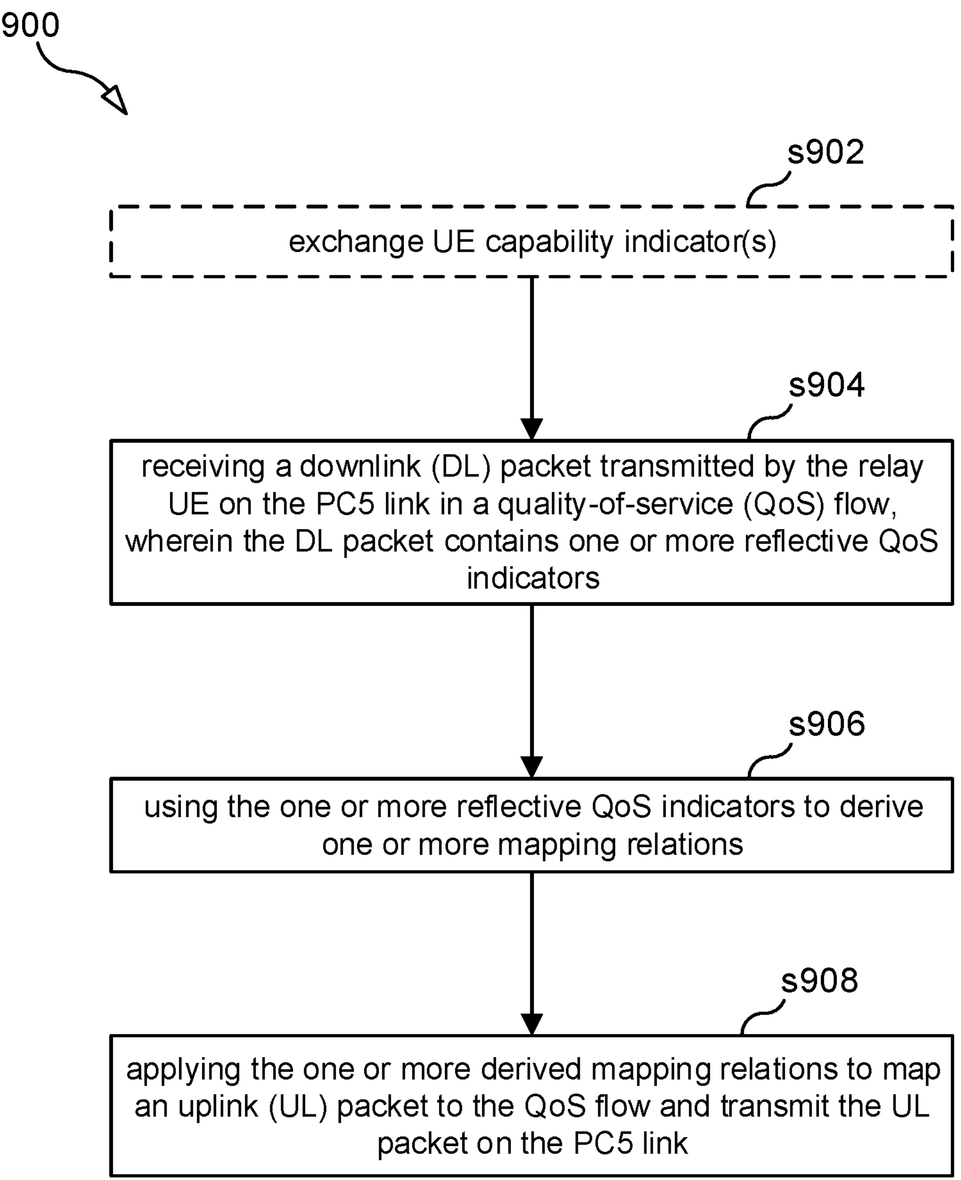
FIG. 9 is a flowchart illustrating a process according to some embodiments.

FIG. 9 illustrates a process 900 performed by the remote UE 501 that has a PC5 link with the relay UE 502 according to some embodiments. In some embodiments, the PC5 link may be a sidelink. In some embodiments, the sidelink may be a New Radio sidelink or a Long Term Evolution sidelink.

In some embodiments, the process 900 may include an optional step 902 of exchanging UE capability indicator(s). In some embodiments, the optional step 902 may include the remote UE 501 transmitting a UE capability indicator that indicates whether the remote UE 501 supports reflective QoS on a PC5 link. In some embodiments, the optional step 902 may additionally or alternatively include the remote UE 501 receiving a UE capability indicator that indicates whether the relay UE 502 supports reflective QoS on a PC5 link. In some embodiments, the optional step 902 may additionally or alternatively include the remote UE 501 transmitting information indicating whether the remote UE 501 will adopt or allow reflective QoS for each of one or more services.

In some embodiments, the process 900 may include a step 904 in which the remote UE 501 receives a downlink (DL) packet transmitted by the relay UE 502 on the PC5 link in a quality-of-service (QoS) flow. In some embodiments, the DL packet may contain one or more reflective QoS indicators. In some embodiments, a header of the DL packet may contain the one or more reflective QoS indicators. In some embodiments, the DL packet may be a service data adaptation protocol (SDAP) packet data unit (PDU), and the header may be an SDAP header. In some embodiments, the one or more reflective QoS indicators may include a QoS Flow Identifier (QFI), a data radio bearer (DRB) mapping indication (RDI), and/or a reflective QoS indication (RQI).

In some embodiments, the process 900 may include a step 906 in which the remote UE 501 uses the one or more reflective QoS indicators to derive one or more mapping relations.

In some embodiments, the process 900 may include a step 908 in which the remote UE 501 applies the one or more derived mapping relations to map an uplink (UL) packet to the QoS flow and transmit the UL packet on the PC5 link. In some embodiments, the UL packet may be an upper layer packet, and the one or more derived mapping relations may include a mapping between upper layer packets and service data flows. In some embodiments, the one or more derived mapping relations may include a mapping between service data flows and data radio bearers.

Figure 10:
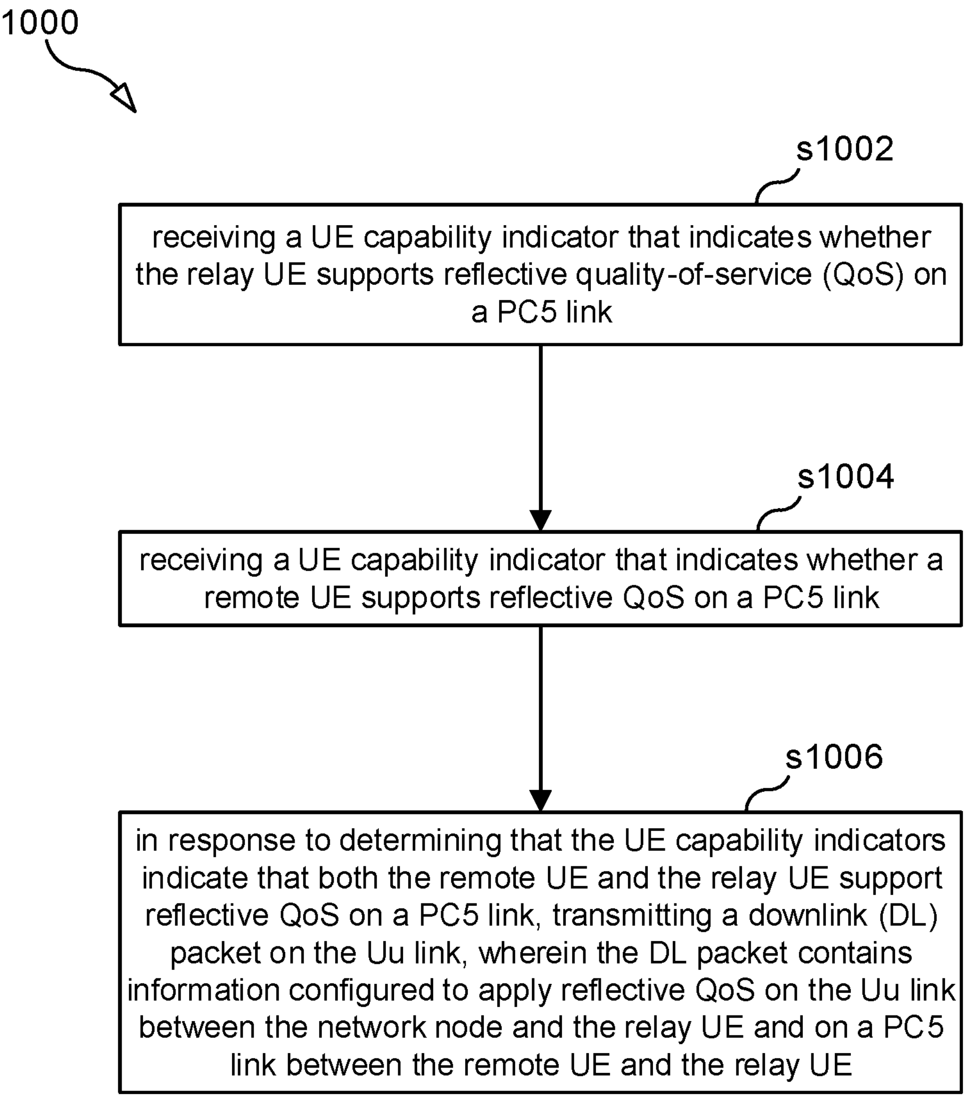
FIG. 10 is a flowchart illustrating a process according to some embodiments.

FIG. 10 illustrates a process 1000 performed by the network node 504 that has a Uu link with a relay UE 502 according to some embodiments.

In some embodiments, the process 1000 may include a step 1002 in which the network node 504 receives a UE capability indicator that indicates whether the relay UE 502 supports reflective quality-of-service (QoS) on a PC5 link. In some embodiments, the process 1000 may include a step 1004 in which the network node 504 receives a UE capability indicator that indicates whether the remote UE 501 supports reflective QoS on a PC5 link.

In some embodiments, the process 1000 may include a step 1006 in which the network node 504, in response to determining that the UE capability indicators indicate that both the remote UE 502 and the relay UE 101 support reflective QoS on a PC5 link, transmitting a downlink (DL) packet on the Uu link. In some embodiments, the DL packet may contain information configured to apply reflective QoS on the Uu link between the network node 504 and the relay UE 502 and on a PC5 link between the remote UE 501 and the relay UE 502. In some embodiments, the information configured to apply reflective QoS on the Uu link between the network node 504 and the relay UE 502 and on a PC5 link between the remote UE 501 and the relay UE 502 may include a Reflective QoS Indication (RQI) and/or a QoS Flow Identifier (QFI).

In some embodiments, the process 1000 may further include, in response to determining that the UE capability indicators do not indicate that both the remote UE 501 and the relay UE 502 support reflective QoS on a PC5 link and determining that the relay UE 502 supports reflective QoS on the Uu link, transmitting a DL packet on the Uu link, and the DL packet may contain information configured to apply reflective QoS on only the Uu link between the network node 504 and the relay UE 502. In some embodiments, the process 1000 may further include, in response to determining that the relay UE 502 does not support reflective QoS on a PC5 link, applying reflective QoS on neither the Uu link between the network node 504 and the relay UE 502 nor on the PC5 link between the remote UE 501 and the relay UE 502.

Figure 11:
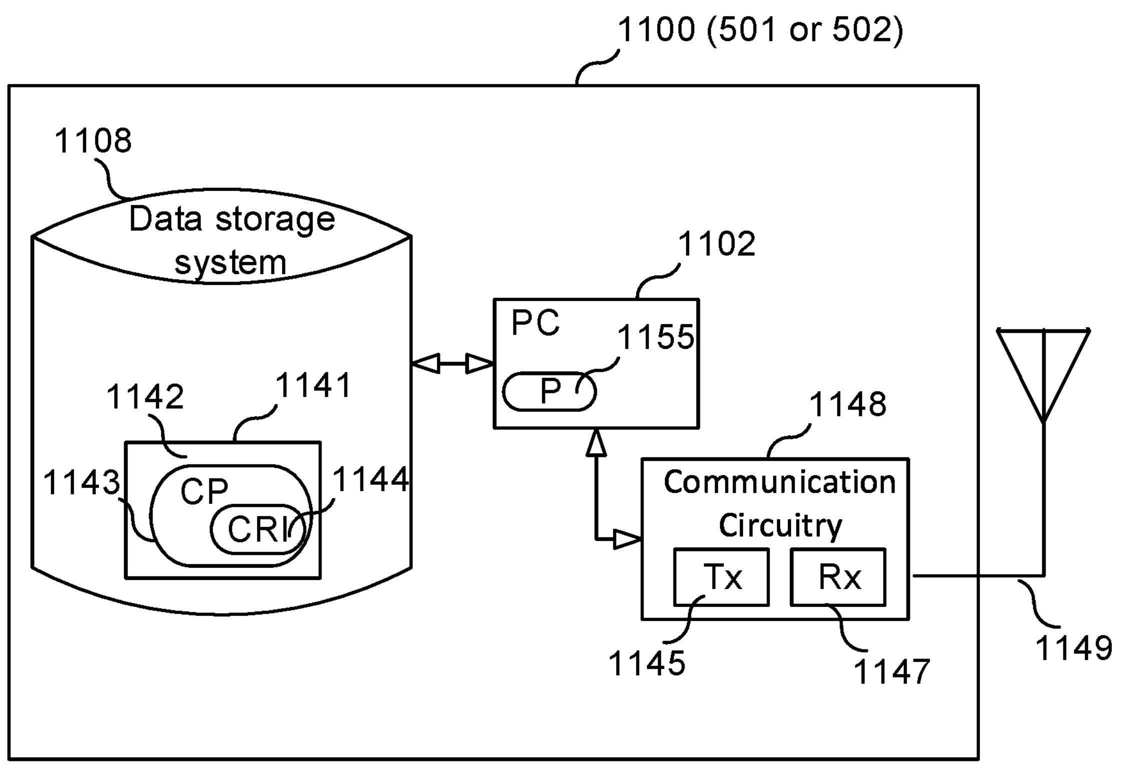
FIG. 11 illustrates a UE according to some embodiments.

FIG. 11 is a block diagram of a UE 1100 (e.g., UE 501 or 502), according to some aspects. As shown in FIG. 16, UE 1100 may comprise: processing circuitry (PC) 1102, which may include one or more processors (P) 1155 (e.g., one or more general purpose microprocessors and/or one or more other processors, such as an application specific integrated circuit (ASIC), field-programmable gate arrays (FPGAs), and the like); communication circuitry 1148, which is coupled to an antenna arrangement 1149 comprising one or more antennas and which comprises a transmitter (Tx) 1145 and a receiver (Rx) 1147 for enabling UE 1100 to transmit data and receive data (e.g., wirelessly transmit/receive data); and a local storage unit (a.k.a., "data storage system") 1108, which may include one or more non-volatile storage devices and/or one or more volatile storage devices. In some aspects where PC 1102 includes a programmable processor, a computer program product (CPP) 1141 may be provided. CPP 1141 includes a computer readable medium (CRM) 1142 storing a computer program (CP) 1143 comprising computer readable instructions (CRI) 1144. CRM 1142 may be a non-transitory computer readable medium, such as, magnetic media (e.g., a hard disk), optical media, memory devices (e.g., random access memory, flash memory), and the like. In some aspects, the CRI 1144 of computer program 1143 is configured such that when executed by PC 1102, the CRI causes UE 1100 to perform steps described herein (e.g., steps described herein with reference to flow charts FIGS. 8 and 9). In other aspects, UE 1100 may be configured to perform steps described herein without the need for code. That is, for example, PC 1102 may consist merely of one or more ASICs. Hence, the features of the aspects described herein may be implemented in hardware and/or software.

Figure 12:
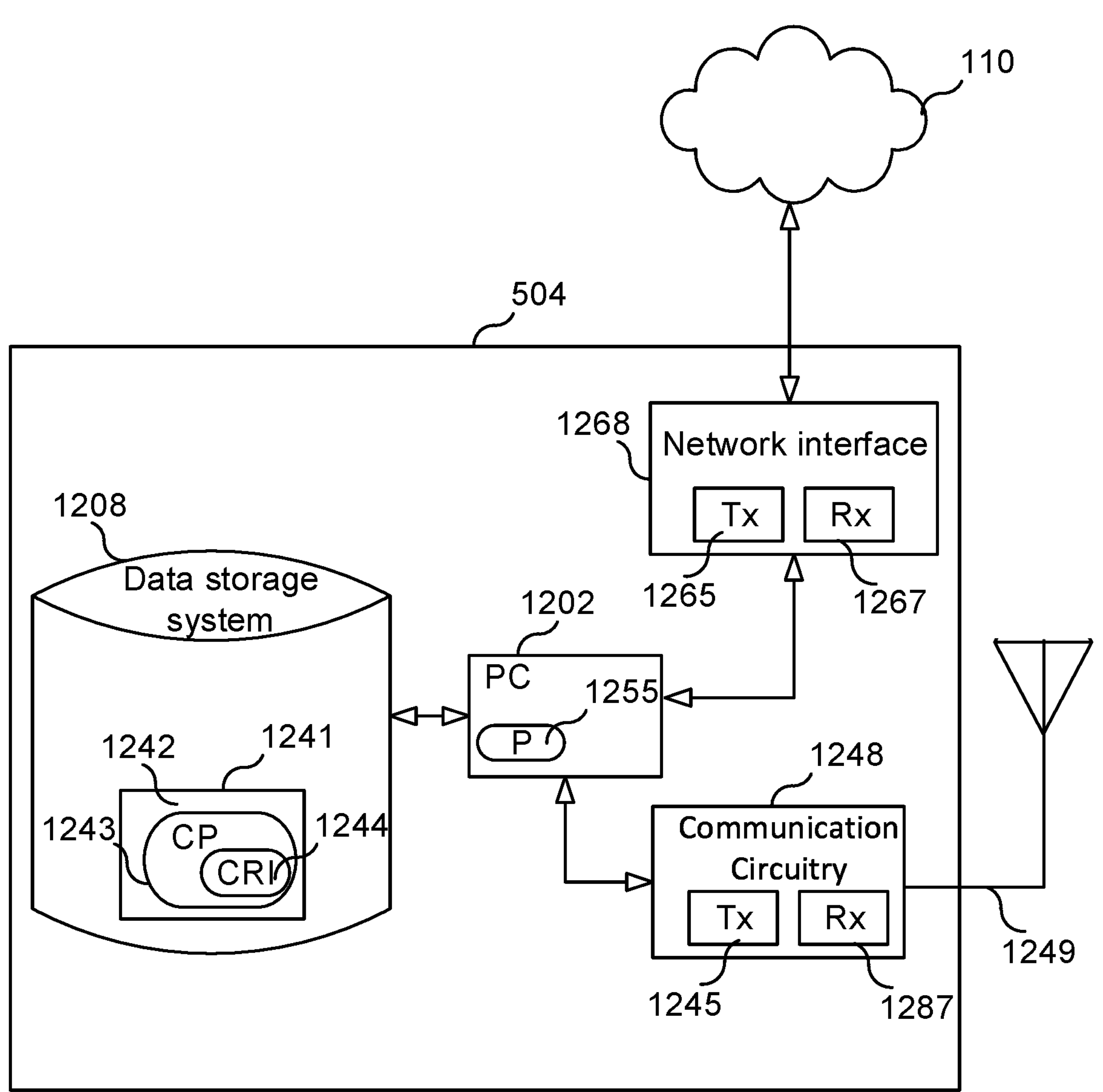
FIG. 12 illustrates a network node according to some embodiments.

FIG. 12 is a block diagram of a network node 504, according to some aspects. As shown in FIG. 12, the network node 504 may comprise: processing circuitry (PC) 1202, which may include one or more processors (P) 1255 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., the network node 504 may be a distributed computing apparatus); a network interface 1268 comprising a transmitter (Tx) 1265 and a receiver (Rx) 1267 for enabling the network node 504 to transmit data to and receive data from other nodes connected to a network 110 (e.g., an Internet Protocol (IP) network) to which network interface 1268 is connected; communication circuitry 1848, which is coupled to an antenna arrangement 1249 comprising one or more antennas and which comprises a transmitter (Tx) 1245 and a receiver (Rx) 1247 for enabling the network node 504 to transmit data and receive data (e.g., wirelessly transmit/receive data); and a local storage unit (a.k.a., "data storage system") 1208, which may include one or more non-volatile storage devices and/or one or more volatile storage devices. In aspects where PC 1202 includes a programmable processor, a computer program product (CPP) 1241 may be provided. CPP 1241 includes a computer readable medium (CRM) 1242 storing a computer program (CP) 1243 comprising computer readable instructions (CRI) 1244. CRM 1242 may be a non-transitory computer readable medium, such as, magnetic media (e.g., a hard disk), optical media, memory devices (e.g., random access memory, flash memory), and the like. In some aspects, the CRI 1244 of computer program 1843 is configured such that when executed by PC 1202, the CRI causes the network node 504 to perform steps described herein (e.g., steps described herein with reference to the flow charts). In other aspects, the network node 504 may be configured to perform steps described herein without the need for code. That is, for example, PC 1202 may consist merely of one or more ASICs. Hence, the features of the aspects described herein may be implemented in hardware and/or software.

Embodiments

Relay UE

A1. A method (800) performed by a relay user equipment (UE) (502) that has a PC5 link with a remote UE (501), the method comprising:

receiving a downlink (DL) packet;

adding one or more reflective quality-of-service (QoS) indicators to the DL packet, thereby creating a modified DL packet; and transmitting the modified DL packet containing the one or more reflective QoS indicators on the PC5 link in a PC5 QoS flow to the remote UE.

A2. The method of embodiment A1, further comprising receiving a UE capability indicator transmitted by the remote UE, wherein the UE capability indicator indicates whether the remote UE supports reflective QoS on a PC5 link.

A3. The method of embodiment A2, further comprising:

using the received UE capability indicator to determine that the remote UE supports reflective QoS on a PC5 link; and adding the one or more reflective QoS indicators to the DL packet in response to determining that the remote UE supports reflective QoS on a PC5 link.

A4. The method of embodiment A2 or A3, further comprising transmitting the UE capability indicator that indicates whether the remote UE supports reflective QoS on a PC5 link to a network node (504) or a second relay UE (502).

A5. The method of any one of embodiments A1-A4, further comprising transmitting a UE capability indicator that indicates whether the relay UE supports reflective QoS on a PC5 link to a network node (504) or a second relay UE (502).

A6. The method of any one of embodiments A1-A5, further comprising receiving service information transmitted by the remote UE, wherein the service information indicates whether the remote UE will adopt or allow reflective QoS for each of one or more services.

A7. The method of any one of embodiments A1-A6, further comprising determining whether the received DL packet is for the relay UE or for the remote UE.

A8. The method of embodiment A7, wherein the received DL packet includes a target Internet Protocol (IP) address, and the target IP address is used to determine whether the received DL packet is for the relay UE or for the remote UE.

A9. The method of embodiment A7 or A8, wherein the received DL packet includes a QoS Flow Identifier (QFI), and the QFI is used to determine whether the received DL packet is for the relay UE or for the remote UE.

A10. The method of any one of embodiments A1-A9, wherein the one or more reflective QoS indicators include a QoS Flow Identifier (QFI), a data radio bearer (DRB) mapping indication (RDI), and/or a reflective QoS indication (RQI).

A11. The method of any one of embodiments A1-A10, wherein the relay UE has a Uu link with a network node (504), and the received DL packet is transmitted by the network node on the Uu link in a Uu QoS flow.

A12. The method of embodiment A11, further comprising deriving one or more mapping relations from the received DL packet.

A13. The method of embodiment A12, wherein the received DL packet includes a header, and the one or more mapping relations are derived using the header.

A14. The method of embodiment A12 or A13, wherein the DL packet is a service data adaptation protocol (SDAP) packet data unit (PDU), and the one or more mapping relations are derived using an SDAP header of the SDAP PDU.

A15. The method of any one of embodiments A12-A14, further comprising:

receiving an uplink (UL) packet transmitted by the remote UE on the PC5 link in the PC5 QoS flow; and applying the one or more derived mapping relations to map the UL packet to the Uu QoS flow and transmit the UL packet on the Uu link to the network node.

A16. The method of any one of embodiments A12-A15, further comprising using the derived one or more mapping relations to determine a PC5 QoS Flow Identifier (PFI) for the received DL packet.

A17. The method of embodiment A16, wherein the received DL packet includes a QoS Flow Identifier (QFI), and the PFI is determined using the QFI of the received DL packet and a table that maps QFIs to PFIs.

A18. The method of any one of embodiments A11-A17, further comprising determining a PC5 data radio bearer (DRB), wherein the determined PC5 DRB is used to carry the PC5 QoS flow.

A19. The method of embodiment A18, further comprising receiving an uplink (UL) packet transmitted by the remote UE on the PC5 link in the PC5 QoS flow carried by the PC5 DRB.

A20. The method of embodiment A18 or A19, wherein a Uu DRB carries the Uu QoS flow, and determining the PC5 DRB comprises comparing the PC5 DRB and the Uu DRB.

A21. The method of embodiment A20, wherein comparing the PC5 DRB and the Uu DRB considers the QoS configurations of the PC5 DRB and the Uu DRB.

A22. The method of embodiment A20 or A21, wherein comparing the PC5 DRB and the Uu DRB considers the QoS configurations of any existing flows being mapped to the PC5 DRB and/or of any existing flows being mapped to the Uu DRB.

A23. The method of embodiment A21 or A22, wherein the QoS configurations include one or more QoS parameters.

A24. The method of embodiment A23, wherein the one or more QoS parameters include priority index, bit rate, packet error rate, latency, packet loss, and/or jitter.

A25. The method of any one of embodiments A20-A25, wherein comparing the PC5 DRB and the Uu DRB considers free capacity or resources on the PC5 DRB and/or free capacity or resources on the Uu DRB.

A26. The method of any one of embodiments A18-A25, wherein the determined PC5 DRB is a PC5 DRB that is mapped or associated with the Uu DRB that carries the Uu QoS flow.

A27. The method of any one of embodiments A18-A26, wherein the determined PC5 DRB is a PC5 DRB that is associated with similar QoS parameters as the Uu DRB that carries the Uu QoS flow.

A28. The method of any one of embodiments A18-A27, wherein the determined PC5 DRB is a PC5 DRB that is able to achieve similar QoS satisfaction as the Uu DRB that carries the Uu QoS flow.

A29a. The method of embodiment A28, wherein whether the PC5 DRB is able to achieve similar QoS satisfaction as the Uu DRB that carries the Uu QoS flow is determined based on how much free sources each of the PC5 DRB and the Uu DRB are able to provide and/or the priority orders of the PC5 DRB and the Uu DRB.

A29b. The method of any one of embodiments A18-A29a, further comprising starting or re-starting a timer when one or more reflective mapping relations for the PC5 DRB are established, changed, or reconfigured, wherein the reflective mapping relations are valid for the PC5 DRB while the timer is running and invalid when the timer is expired.

A30. The method of any one of embodiments A1-A29b, wherein the received DL packet includes a header, and the one or more reflective QoS indicators are added to the header of the DL packet.

A31. The method of embodiment A30, wherein the DL packet is a service data adaptation protocol (SDAP) packet data unit (PDU), and the one or more reflective QoS indicators are added to an SDAP header of the SDAP PDU.

A32. The method of any one of embodiments A1-A31, further comprising receiving an uplink (UL) packet transmitted by the remote UE on the PC5 link in the PC5 QoS flow.

A33. The method of embodiment A32, wherein the relay UE has a Uu link with a network node (504), the received DL packet was transmitted by the network node on the Uu link in a Uu QoS flow, and the method further comprises transmitting the UL packet on the Uu link in the Uu QoS flow to the network node.

A34. The method of any one of embodiments A1-A10 and A30-A32, wherein the relay UE has a second PC5 link with a second relay UE, and the received DL packet was transmitted by the second relay UE on the second PC5 link in a second PCF QoS flow.

A35. The method of embodiment A34, further comprising:

receiving an uplink (UL) packet transmitted by the remote UE on the PC5 link in the PC5 QoS flow; and transmitting the UL packet on the second PC5 link in the second PC5 QoS flow to the second relay UE.

A36. The method of embodiment A35, further comprising one or more of:

deriving one or more mapping relations from the received DL packet;

applying the one or more derived mapping relations to map the UL packet to the second PC5 QoS flow and transmit the UL packet on the second PC5 link to the second relay UE;

using the derived one or more mapping relations to determine a PC5 QoS Flow Identifier (PFI) for the received DL packet; and determining a PC5 data radio bearer (DRB), wherein the determined PC5 DRB is used to carry the PC5 QoS flow.

A37. The method of any one of embodiments A1-A36, wherein the remote UE and the relay UE are UEs on a path containing multiple PC5 link hops, and the method further comprises the relay UE receiving UE capability indicators transmitted by each of the other UEs on the path, wherein the UE capability indicators indicates whether the UE supports reflective QoS on a PC5 link.

A38. The method of embodiment A37, further comprising:

using the received UE capability indicators to determine that all of the UEs on the path support reflective QoS on a PC5 link; and adding the one or more reflective QoS indicators to the DL packet in response to determining that all of the UEs on the path support reflective QoS on a PC5 link.

A39. The method of any one of embodiments A1-A38, wherein the remote UE and the relay UE are UEs on a relay path segment containing multiple PC5 link hops, and the method further comprises the relay UE receiving UE capability indicators transmitted by each of the other UEs on the relay path segment, wherein the UE capability indicators indicates whether the UE supports reflective QoS on a PC5 link.

A40. The method of embodiment A39, further comprising:

using the received UE capability indicators to determine that all of the UEs on the relay path segment support reflective QoS on a PC5 link; and adding the one or more reflective QoS indicators to the DL packet in response to determining that all of the UEs on the relay path segment support reflective QoS on a PC5 link.

A41. The method of embodiment A39 or A40, wherein the relay path segment is one part of an end to end connection between two remote UEs.

A42. The method of any one of embodiments A1-A41, further comprising, for a UE to network relay, maintaining a mapping table between PC5 QoS Flow Identifiers (PFIs) and QoS Flow Identifiers (QFIs).

A43. The method of any one of embodiments A1-A42, further comprising, for UE to UE relay, maintaining a mapping table between QoS Flow Identifiers (QFIs) of a hop and QFIs of another hop.

A44. The method of any one of embodiments A1-A42, further comprising, for UE to UE relay, using the same QoS Flow Identifiers (QFIs) for all interconnected flows between two hops.

B1. A relay user equipment (UE) (502) adapted to:

receive a downlink (DL) packet;

add one or more reflective quality-of-service (QoS) indicators to the DL packet, thereby creating a modified DL packet; and transmit the modified DL packet containing the one or more reflective QoS indicators on a PC5 link in a PC5 QoS flow to a remote UE (501).

C1. A method (900) performed by a remote user equipment (UE) (501) that has a PC5 link with a relay UE (502), the method comprising:

receiving a downlink (DL) packet transmitted by the relay UE on the PC5 link in a quality-of-service (QoS) flow, wherein the DL packet contains one or more reflective QoS indicators;

using the one or more reflective QoS indicators to derive one or more mapping relations; and applying the one or more derived mapping relations to map an uplink (UL) packet to the QoS flow and transmit the UL packet on the PC5 link.

C2. The method of embodiment C1, wherein a header of the DL packet contains the one or more reflective QoS indicators.

C3. The method of embodiment C2, wherein the DL packet is a service data adaptation protocol (SDAP) packet data unit (PDU), and the header is an SDAP header.

C4. The method of any one of embodiments C1-C3, wherein the one or more reflective QoS indicators include a QoS Flow Identifier (QFI), a data radio bearer (DRB) mapping indication (RDI), and/or a reflective QoS indication (RQI).

C5. The method of any one of embodiments C1-C4, wherein the PC5 link is a sidelink.

C6. The method of embodiment C5, wherein the sidelink is a New Radio sidelink.

C7. The method of embodiment C5, wherein the sidelink is a Long Term Evolution sidelink.

C8. The method of any one of embodiments C1-C7, wherein the UL packet is an upper layer packet, and the one or more derived mapping relations include a mapping between upper layer packets and service data flows.

C9. The method of any one of embodiments C1-C8, wherein the one or more derived mapping relations include a mapping between service data flows and data radio bearers.

C10. The method of any one of embodiments C1-C9, further comprising transmitting a UE capability indicator that indicates whether the remote UE supports reflective QoS on a PC5 link.

C11. The method of any one of embodiments C1-C10, further comprising receiving a UE capability indicator that indicates whether the relay UE supports reflective QoS on a PC5 link.

C12. The method of any one of embodiments C1-C11, further comprising transmitting information indicating whether the remote UE will adopt or allow reflective QoS for each of one or more services.

D1. A remote user equipment (UE) (501) adapted to:

receive a downlink (DL) packet transmitted by a relay UE (502) on a PC5 link in a quality-of-service (QoS) flow, wherein the DL packet contains one or more reflective QoS indicators;

use the one or more reflective QoS indicators to derive one or more mapping relations; and apply the one or more derived mapping relations to map an uplink (UL) packet to the QoS flow and transmit the UL packet on the PC5 link.

E1. A method (1000) performed by a network node (504) that has a Uu link with a relay UE (502), the method comprising:

receiving a UE capability indicator that indicates whether the relay UE supports reflective quality-of-service (QoS) on a PC5 link;

receiving a UE capability indicator that indicates whether a remote UE (501) supports reflective QoS on a PC5 link;

in response to determining that the UE capability indicators indicate that both the remote UE and the relay UE support reflective QoS on a PC5 link, transmitting a downlink (DL) packet on the Uu link, wherein the DL packet contains information configured to apply reflective QoS on the Uu link between the network node and the relay UE and on a PC5 link between the remote UE and the relay UE.

E2. The method of embodiment E1, wherein the information configured to apply reflective QoS on the Uu link between the network node and the relay UE and on a PC5 link between the remote UE and the relay UE comprises a Reflective QoS Indication (RQI) and/or a QoS Flow Identifier (QFI).

E3. The method of embodiment E1 or E2, further comprising, in response to determining that the UE capability indicators do not indicate that both the remote UE and the relay UE support reflective QoS on a PC5 link and determining that the relay UE supports reflective QoS on the Uu link, transmitting a DL packet on the Uu link, wherein the DL packet contains information configured to apply reflective QoS on only the Uu link between the network node and the relay UE.

F1. A network node (504) adapted to:

receive a UE capability indicator that indicates whether a relay UE (502) supports reflective quality-of-service (QoS) on a PC5 link;

receive a UE capability indicator that indicates whether a remote UE (501) supports reflective QoS on a PC5 link;

in response to determining that the UE capability indicators indicate that both the remote UE and the relay UE support reflective QoS on a PC5 link, transmit a downlink (DL) packet on a Uu link between the network node and the relay node, wherein the DL packet contains information configured to apply reflective QoS on the Uu link between the network node and the relay UE and on a PC5 link between the remote UE and the relay UE.

G1. A computer program comprising instructions for adapting an apparatus to perform the method of any one of embodiments A1-A44, C1-C12, and E1-E3.

H1. A carrier containing the computer program of embodiment G1, wherein the carrier is one of an electronic signal, optical signal, radio signal, or compute readable storage medium.

I1. An apparatus (1101), the apparatus comprising:

processing circuitry (1102); and a memory (1142), said memory containing instructions (1144) executable by said processing circuitry, whereby said apparatus is operative to perform the method of any one of the embodiments A1-A44, C1-C12, and E1-E3.

J1. An apparatus (1101) adapted to perform the method of any one of embodiments A1-A44, C1-C12, and E1-E3.

K1. Any combination of the embodiments set forth above.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a relay user equipment (UE) that has a PC5 link with a remote UE, the method comprising:

receiving a downlink (DL) packet;

adding one or more reflective quality-of-service (QoS) indicators to the DL packet, thereby creating a modified DL packet containing one or more reflective QoS indicators; and transmitting the modified DL packet containing the one or more reflective QoS indicators on the PC5 link in a PC5 QoS flow to the remote UE, wherein the method further comprises:

receiving a UE capability indicator transmitted by the remote UE, wherein the UE capability indicator indicates whether the remote UE supports reflective QoS on a PC5 link;

using the received UE capability indicator to determine that the remote UE supports reflective QoS on a PC5 link;

transmitting the UE capability indicator that indicates whether the remote UE supports reflective QoS on a PC5 link to a network node or a second relay UE;

transmitting a UE capability indicator that indicates whether the relay UE supports reflective QoS on a PC5 link to a network node or a second relay UE; and receiving service information transmitted by the remote UE, wherein the service information indicates whether the remote UE will adopt or allow reflective QoS for each of one or more services, and the relay UE adds the one or more reflective QoS indicators to the DL packet in response to determining that the remote UE supports reflective QoS on a PC5 link.

2. The method of claim 1, further comprising determining whether the received DL packet is for the relay UE or for the remote UE; and wherein the received DL packet includes a target Internet Protocol (IP) address, and the target IP address is used to determine whether the received DL packet is for the relay UE or for the remote UE; and/or wherein the received DL packet includes a QoS Flow Identifier (QFI), and the QFI is used to determine whether the received DL packet is for the relay UE or for the remote UE.

3. The method of claim 1, wherein the one or more reflective QoS indicators include a QoS Flow Identifier (QFI), a data radio bearer (DRB) mapping indication (RDI), and/or a reflective QoS indication (RQI).

4. The method of claim 1, wherein the relay UE has a Uu link with a network node, and the received DL packet is transmitted by the network node on the Uu link in a Uu QoS flow; and wherein the method further comprises deriving one or more mapping relations from the received DL packet;

wherein the received DL packet includes a header, and the one or more mapping relations are derived using the header; and/or wherein the DL packet is a service data adaptation protocol (SDAP) packet data unit (PDU), and the one or more mapping relations are derived using an SDAP header of the SDAP PDU.

5. The method of claim 4, further comprising:

receiving an uplink (UL) packet transmitted by the remote UE on the PC5 link in the PC5 QoS flow; and applying the one or more derived mapping relations to map the UL packet to the Uu QoS flow and transmit the UL packet on the Uu link to the network node.

6. The method of claim 4, further comprising using the derived one or more mapping relations to determine a PC5 QoS Flow Identifier (PFI) for the received DL packet;

wherein the received DL packet includes a QoS Flow Identifier (QFI), and the PFI is determined using the QFI of the received DL packet and a table that maps QFIs to PFIs.

7. The method of claim 4, further comprising determining a PC5 data radio bearer (DRB), wherein the determined PC5 DRB is used to carry the PC5 QoS flow; and receiving an uplink (UL) packet transmitted by the remote UE on the PC5 link in the PC5 QoS flow carried by the PC5 DRB;

wherein a Uu DRB carries the Uu QoS flow, and determining the PC5 DRB comprises comparing the PC5 DRB and the Uu DRB;

wherein comparing the PC5 DRB and the Uu DRB considers the QoS configurations of the PC5 DRB and the Uu DRB, of any existing flows being mapped to the PC5 DRB, and/or of any existing flows being mapped to the Uu DRB, the QoS configurations include one or more QoS parameters, and the one or more QoS parameters include priority index, bit rate, packet error rate, latency, packet loss, and/or jitter; and wherein comparing the PC5 DRB and the Uu DRB considers free capacity or resources on the PC5 DRB and/or free capacity or resources on the Uu DRB.

8. The method of claim 7, wherein the determined PC5 DRB is a PC5 DRB that is mapped or associated with the Uu DRB that carries the Uu QoS flow; or wherein the determined PC5 DRB is a PC5 DRB that is associated with similar QoS parameters as the Uu DRB that carries the Uu QoS flow; or wherein the determined PC5 DRB is a PC5 DRB that is able to achieve similar QoS satisfaction as the Uu DRB that carries the Uu QoS flow, and whether the PC5 DRB is able to achieve similar QoS satisfaction as the Uu DRB that carries the Uu QoS flow is determined based on how much free sources each of the PC5 DRB and the Uu DRB are able to provide and/or the priority orders of the PC5 DRB and the Uu DRB.

9. The method of claim 7, further comprising starting or re-starting a timer when one or more reflective mapping relations for the PC5 DRB are established, changed, or reconfigured, wherein the reflective mapping relations are valid for the PC5 DRB while the timer is running and invalid when the timer is expired.

10. The method of claim 1, wherein the received DL packet includes a header, the one or more reflective QoS indicators are added to the header of the DL packet, the DL packet is a service data adaptation protocol (SDAP) packet data unit (PDU), and the one or more reflective QoS indicators are added to an SDAP header of the SDAP PDU.

11. The method of claim 1, further comprising receiving an uplink (UL) packet transmitted by the remote UE on the PC5 link in the PC5 QoS flow.

12. The method of claim 11, wherein the relay UE has a Uu link with a network node, the received DL packet was transmitted by the network node on the Uu link in a Uu QoS flow, and the method further comprises transmitting the UL packet on the Uu link in the Uu QoS flow to the network node.

13. The method of claim 1, wherein the relay UE has a second PC5 link with a second relay UE, and the received DL packet was transmitted by the second relay UE on the second PC5 link in a second PCF QoS flow;

the method further comprises:

receiving an uplink (UL) packet transmitted by the remote UE on the PC5 link in the PC5 QoS flow;

transmitting the UL packet on the second PC5 link in the second PC5 QoS flow to the second relay UE; and the method further comprises one or more of:

deriving one or more mapping relations from the received DL packet;

applying the one or more derived mapping relations to map the UL packet to the second PC5 QoS flow and transmit the UL packet on the second PC5 link to the second relay UE;

using the derived one or more mapping relations to determine a PC5 QoS Flow Identifier (PFI) for the received DL packet; and determining a PC5 data radio bearer (DRB), wherein the determined PC5 DRB is used to carry the PC5 QoS flow.

14. The method of claim 1, further comprising:

for a UE to network relay, maintaining a mapping table between PC5 QoS Flow Identifiers (PFIs) and QoS Flow Identifiers (QFIs); or for UE to UE relay, using the same QoS Flow Identifiers (QFIs) for all interconnected flows between two hops.

15. A relay user equipment (UE) comprising:

processing circuitry; and a memory, said memory containing instructions executable by said processing circuitry, whereby the relay UE is operative to:

receive a downlink (DL) packet;

add one or more reflective quality-of-service (QoS) indicators to the DL packet, thereby creating a modified DL packet containing one or more reflective QoS indicators; and transmit the modified DL packet containing the one or more reflective QoS indicators on a PC5 link in a PC5 QoS flow to a remote UE, wherein the UE is further operative to:

receive a UE capability indicator transmitted by the remote UE, wherein the UE capability indicator indicates whether the remote UE supports reflective QoS on a PC5 link;

use the received UE capability indicator to determine that the remote UE supports reflective QoS on a PC5 link;

add the one or more reflective QoS indicators to the DL packet in response to determining that the remote UE supports reflective QoS on a PC5 link;

transmit the UE capability indicator that indicates whether the remote UE supports reflective QoS on a PC5 link to a network node or a second relay UE;

transmit a UE capability indicator that indicates whether the relay UE supports reflective QoS on a PC5 link to a network node or a second relay UE; and receive service information transmitted by the remote UE, wherein the service information indicates whether the remote UE will adopt or allow reflective QoS for each of one or more services.

16. The method of claim 1, wherein, the method further comprises receiving a UE capability indicator transmitted by the remote UE, and the one or more reflective QoS indicators are added to the DL packet in response to determining, based on the UE capability indicator, that the remote UE supports reflective QoS on a PC5 link.

* * * * *